US009094993B2

(12) United States Patent
Horiuchi et al.

(10) Patent No.: US 9,094,993 B2
(45) Date of Patent: Jul. 28, 2015

(54) WIRELESS COMMUNICATION RELAY STATION APPARATUS, WIRELESS COMMUNICATION BASE STATION APPARATUS, WIRELESS COMMUNICATION MOBILE STATION

(75) Inventors: Ayako Horiuchi, Kanagawa (JP); Seigo Nakao, Kanagawa (JP); Kenichi Miyoshi, Kanagawa (JP); Megumi Ichikawa, legal representative, Kanagawa (JP); Akihiko Nishio, Kanagawa (JP); Yasuaki Yuda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 944 days.

(21) Appl. No.: 13/264,197

(22) PCT Filed: Apr. 26, 2010

(86) PCT No.: PCT/JP2010/002997
§ 371 (c)(1),
(2), (4) Date: Oct. 13, 2011

(87) PCT Pub. No.: WO2010/125798
PCT Pub. Date: Nov. 4, 2010

(65) Prior Publication Data
US 2012/0093064 A1    Apr. 19, 2012

(30) Foreign Application Priority Data

Apr. 27, 2009 (JP) ................................. 2009-107992

(51) Int. Cl.
*H04W 72/04* (2009.01)
*H04B 7/14* (2006.01)
(Continued)

(52) U.S. Cl.
CPC ....... *H04W 72/1205* (2013.01); *H04B 7/15521* (2013.01); *H04L 5/0037* (2013.01);
(Continued)

(58) Field of Classification Search
None
See application file for complete search history.

(56) References Cited

U.S. PATENT DOCUMENTS 7,751,776 B2  7/2010 Fujita
7,952,988 B2  5/2011 Lee et al.
(Continued)

FOREIGN PATENT DOCUMENTS

JP   2002-111571 A   4/2002
JP   2007-166620 A   6/2007
(Continued)

OTHER PUBLICATIONS

3GPP TSG RAN WG1 Meeting #56, R1-090734, "Considerations on TDD Relay", Nokia, Nokia Siemens Networks, Athens, Greece, Feb. 9-13, 2009.
(Continued)

*Primary Examiner* — Chi H Pham
*Assistant Examiner* — Shick Hom
(74) *Attorney, Agent, or Firm* — Pearne & Gordon LLP

(57) ABSTRACT

There is provided a wireless communication relay station apparatus and a wireless communication base station apparatus capable of allocating resources dynamically to each apparatus in accordance with traffic. A wireless communication relay station apparatus according to the invention includes a receiver that receives data from the wireless communication base station apparatus or the wireless communication mobile station apparatus, and a selector that selects data, within an uplink subframe or a downlink subframe, from: first data to be relayed from the own apparatus to the wireless communication base station apparatus; second data to be relayed from the own apparatus to the wireless communication mobile station apparatus; third data to be relayed from the wireless communication base station apparatus to the own apparatus; and fourth data to be relayed from the wireless communication mobile station apparatus to the own apparatus. The receiver receives allocation information for switching transmission/reception in the own apparatus from the wireless communication mobile station apparatus within an uplink subframe or a downlink subframe. The selector switches the first data and the fourth data within the uplink subframe in accordance with the allocation information received by the receiver, or the selector switches the second data and the third data within the downlink subframe in accordance with the allocation information received by the receiver.

11 Claims, 15 Drawing Sheets

(51) Int. Cl.
  *H04W 72/12* (2009.01)
  *H04B 7/155* (2006.01)
  *H04J 11/00* (2006.01)
  *H04L 5/00* (2006.01)
  *H04L 25/02* (2006.01)
  *H04L 25/03* (2006.01)
  *H04W 84/04* (2009.01)

(52) U.S. Cl.
  CPC ............ *H04J 11/005* (2013.01); *H04L 5/0007* (2013.01); *H04L 5/0064* (2013.01); *H04L 5/0089* (2013.01); *H04L 5/0094* (2013.01); *H04L 25/0204* (2013.01); *H04L 25/03159* (2013.01); *H04L 25/03343* (2013.01); *H04W 72/1252* (2013.01); *H04W 84/047* (2013.01)

(56) References Cited

U.S. PATENT DOCUMENTS

| | | | |
|---|---|---|---|
| 2002/0013162 A1* | 1/2002 | Whitney | 455/557 |
| 2007/0015462 A1 | 1/2007 | Dean et al. | |
| 2008/0107073 A1 | 5/2008 | Hart et al. | |
| 2009/0080366 A1* | 3/2009 | Shao et al. | 370/315 |
| 2010/0238984 A1* | 9/2010 | Sayana et al. | 375/219 |
| 2011/0013536 A1* | 1/2011 | Falahati et al. | 370/252 |

FOREIGN PATENT DOCUMENTS

| | | |
|---|---|---|
| JP | 2008-48286 A | 2/2008 |
| JP | 2008-136201 A | 6/2008 |
| JP | 2009-502056 A | 1/2009 |

OTHER PUBLICATIONS

International Search Report for PCT/JP2010/002997 dated Jul. 13, 2010.

International Preliminary Report on Patentability dated Aug. 8, 2011.

* cited by examiner

WIRELESS COMMUNICATION RELAY STATION APPARATUS, WIRELESS COMMUNICATION BASE STATION APPARATUS, WIRELESS COMMUNICATION MOBILE STATION

TECHNICAL FIELD

The present invention relates to a wireless communication relay station apparatus, a wireless communication base station apparatus, a wireless communication mobile station apparatus and a wireless communication method, and in particular relates to a wireless communication relay station apparatus, a wireless communication base station apparatus, a wireless communication mobile station apparatus and a wireless communication method for transmitting/receiving data to/from another wireless communication apparatus via the wireless communication relay station apparatus.

BACKGROUND ART

In recent years, in a cellular mobile communication system, it has been becoming a common practice to transmit not only sound data but also large-volume data such as static image data and moving image data along with implementation of multimedia information service. In order to realize large-volume data transmission, studies have been actively conducted on a technique for realizing a high transmission rate by utilizing a high frequency wireless bandwidth.

However, when a high frequency wireless bandwidth is utilized, a high transmission rate can be expected at a short distance but attenuation is increased in accordance with a transmission distance as the distance is long. Hence, when a mobile communication system in which a high frequency wireless bandwidth is utilized is actually placed in operation, a coverage area of a wireless communication base station apparatus (hereinafter abbreviated as a "base station") is reduced, and therefore, there arises the necessity for installation of a larger number of base stations. Since the cost of installation of base stations is considerably high, there is a strong demand for a technique for realizing communication service that utilizes a high frequency wireless bandwidth while suppressing an increase in the number of base stations.

To satisfy such a demand, studies have been conducted on a relay transmission technique in which a wireless communication relay station apparatus (hereinafter abbreviated as a "relay station") is installed between a base station and a wireless communication mobile station apparatus (hereinafter abbreviated as a "mobile station") so as to increase a coverage area of each base station, and communication between the base station and the mobile station is performed via the relay station. FIG. 17 is a schematic diagram illustrating an overall configuration of a relay system in a related art. With the use of the relay technique illustrated in FIG. 17, a terminal (mobile station 20), which is unable to directly communicate with a base station 10, is also allowed to communicate with the base station 10 via a relay station 30. Note that a mobile station 21 is a terminal subordinate to the base station 10.

[Description of TD Relay in TDD]

Further, as a method for dividing links into an uplink (UL) and a downlink (DL), a TDD system is known. In the TDD system, links are divided into an uplink (UL) and a downlink (DL) in a time-division manner. Referring to FIG. 18, general outlines of a relay system in which a relay station is applied in the TDD system will be described below. FIG. 18 is a conceptual diagram of the relay system in which a relay station 30 is applied in the TDD system.

As illustrated in FIG. 18, the relay station 30 (RN) uses part of resources, allocated to an uplink (UL), and part of resources, allocated to a downlink (DL), to transmit/receive data to/from a base station 10 (eNB), and during this period, the relay station 30 (RN) suspends service provided to a mobile station 20 (UE2) connected to the relay station 30 (RN). FIG. 18 illustrates an example in which subframes #2 and #3 are uplink (UL) subframes serving as subframes for the uplink, and subframes #4 and #5 are downlink (UL) subframes serving as subframes for the downlink. In this example, the subframes #3 and #4 are used to perform communication between the relay station 30 (RN) and the base station 10 (eNB) through the uplink (UL) and the downlink (DL), respectively.

CITATION LIST

Non-Patent Literature

Non-Patent Literature 1: 3GPP TSG RAN WG1 Meeting #56, R1-090734, "Considerations on TDD Relay", Nokia, Nokia Siemens Networks, Athens, Greece, Feb. 9-13, 2009

SUMMARY OF THE INVENTION

Technical Problem

As described above, the use of the subframe through which the relay station 30 (RN) communicates with the base station 10 (eNB) does not allow the relay station 30 (RN) to transmit/receive data to/from the mobile station 20 (UE2), connected to the relay station 30 (RN), even if the allocation of data between the relay station 30 (RN) and the base station 10 (eNB) is small.

Furthermore, in transmitting data to the base station 10 (eNB), the relay station 30 (RN) hastens the transmission in accordance with a transmission delay so that timing is right for reception of the data by the base station 10 (eNB), and the relay station 30 (RN) receives data from the base station 10 (eNB) at a time later than a time, at which the data has been transmitted from the base station 10 (eNB), in accordance with a transmission delay.

Accordingly, as illustrated in FIG. 18, of OFDM symbols or single carrier symbols constituting the subframe, a head symbol (i.e., a symbol with a number "0" in FIG. 18) cannot be transmitted by the relay station 30 (RN) through the uplink (UL). Moreover, a final symbol (i.e., a symbol with a number "14" in FIG. 18) cannot be received through the downlink (DL). This is because the timing of transmission of data to the base station 10 (eNB) and the timing of reception of data from the mobile station 20 (UE2) in a previous subframe coincide with each other through the uplink (UL), and the timing of reception of data from the base station 10 (eNB) and the timing of transmission of data to the mobile station 20 (UE2) in a next subframe coincide with each other. The number of the symbols for which the timings coincide with each other is influenced by a transmission delay amount between the base station 10 (eNB) and the relay station 30 (RN).

An object of the present invention is to provide a wireless communication relay station apparatus, a wireless communication base station apparatus, a wireless communication mobile station apparatus and a wireless communication method which allow resources to be suitably allocated to each apparatus depending on traffic.

Solution to Problem

The present invention provides a wireless communication relay station apparatus for relaying communication established between a wireless communication base station apparatus and a wireless communication mobile station apparatus, the wireless communication relay station apparatus including: a receiver that is configured to receive data from the wireless communication base station apparatus or the wireless communication mobile station apparatus; and a selector that is configured to select data, within an uplink subframe or a downlink subframe, from: first data to be relayed from the own apparatus to the wireless communication base station apparatus; second data to be relayed from the own apparatus to the wireless communication mobile station apparatus; third data to be relayed from the wireless communication base station apparatus to the own apparatus; and fourth data to be relayed from the wireless communication mobile station apparatus to the own apparatus, wherein the receiver is configured to receive allocation information for switching transmission/reception in the own apparatus from the wireless communication mobile station apparatus within an uplink subframe or a downlink subframe, and the selector is configured to switch the first data and the fourth data within the uplink subframe in accordance with the allocation information received by the receiver, or the selector is configured to switch the second data and the third data within the downlink subframe in accordance with the allocation information received by the receiver.

In the wireless communication relay station apparatus, the receiver is configured to receive the allocation information which has been set in a unit of slot being half of the uplink subframe or the downlink subframe from the wireless communication base station apparatus, and the selector is configured to switch the first data and the fourth data within the uplink subframe in accordance with the allocation information received by the receiver, or the selector is configured to switch the second data and the third data within the downlink subframe in accordance with the allocation information received by the receiver.

In the wireless communication relay station apparatus, the receiver is configured to receive the allocation information including an OFDM symbol for switching transmission/reception in the own apparatus from the wireless communication base station apparatus within the uplink subframe or the downlink subframe, and the selector is configured to switch the first data and the fourth data within the uplink subframe in accordance with the allocation information received by the receiver, or the selector is configured to switch the second data and the third data within the downlink subframe in accordance with the allocation information received by the receiver.

The present invention also provides a wireless communication base station apparatus for communicating with a wireless communication mobile station apparatus via a wireless communication relay station apparatus, the wireless communication base station apparatus including: a receiver that is configured to receive data from the wireless communication relay station apparatus; a transmitter that is configured to transmit data to the wireless communication relay station apparatus; and an allocation information generator that is configured to generate allocation information for switching transmission/reception in the wireless communication relay station apparatus within an uplink subframe or a downlink subframe, wherein the transmitter is configured to transmit the allocation information to the wireless communication relay station apparatus.

In the wireless communication base station apparatus the allocation information generator is configured to generate the allocation information including an OFDM symbol for switching transmission/reception in the wireless communication relay station apparatus within the uplink subframe or the downlink subframe, and the transmitter is configured to transmit the allocation information to the wireless communication relay station apparatus The present invention also provides a wireless communication mobile station apparatus for communicating with a wireless communication base station apparatus via a wireless communication relay station apparatus, the wireless communication mobile station apparatus including: a receiver that is configured to receive data from the wireless communication relay station apparatus; a transmitter that is configured to transmit data to the wireless communication relay station apparatus; and a selector that is configured to select data, within an uplink subframe or a downlink subframe, from fifth data to be relayed from the own apparatus to the wireless communication relay station apparatus and sixth data to be relayed from the own apparatus to the wireless communication relay station apparatus, wherein the receiver is configured to receive allocation information for switching transmission/reception in the own apparatus from the wireless communication base station apparatus via the wireless communication relay station apparatus within an uplink subframe or a downlink subframe, and the selector is configured to select the sixth data within the uplink subframe in accordance with the allocation information, or the selector is configured to select the fifth data within the downlink subframe in accordance with the allocation information.

The present invention also provides a wireless communication method for relaying communication established between a wireless communication base station apparatus and a wireless communication mobile station apparatus, the wireless communication method including: receiving data from the wireless communication base station apparatus or the wireless communication mobile station apparatus; selecting data, within an uplink subframe or a downlink subframe, from: first data to be relayed from an own apparatus to the wireless communication base station apparatus; second data to be relayed from the own apparatus to the wireless communication mobile station apparatus; third data to be relayed from the wireless communication base station apparatus to the own apparatus; and fourth data to be relayed from the wireless communication mobile station apparatus to the own apparatus; receiving allocation information for switching transmission/reception in the own apparatus from the wireless communication mobile station apparatus within an uplink subframe or a downlink subframe; and switching the first data and the fourth data within the uplink subframe in accordance with the received allocation information, or switching the second data and the third data within the downlink subframe in accordance with the received allocation information.

The present invention also provides a wireless communication method for communicating with a wireless communication mobile station apparatus via a wireless communication relay station apparatus, the wireless communication method including: generating allocation information for switching transmission/reception in the wireless communication relay station apparatus within an uplink subframe or a downlink subframe; and transmitting the allocation information to the wireless communication relay station apparatus.

The present invention also provides a wireless communication method for communicating with a wireless communication base station apparatus via a wireless communication relay station apparatus, the wireless communication method including: selecting data, within an uplink subframe or a downlink subframe, from fifth data to be relayed from an own apparatus to the wireless communication relay station apparatus and sixth data to be relayed from the own apparatus to the wireless communication relay station apparatus; receiving allocation information for switching transmission/reception in the own apparatus from the wireless communication base station apparatus via the wireless communication relay station apparatus within an uplink subframe or a downlink subframe; and selecting the sixth data within the uplink subframe in accordance with the allocation information, or selecting the fifth data within the downlink subframe in accordance with the allocation information.

Advantageous Effects of the Invention

A wireless communication relay station apparatus, a wireless communication base station apparatus, a wireless communication mobile station apparatus and a wireless communication method according to the present invention allow resources to be dynamically allocated to each apparatus in accordance with traffic.

MODE FOR CARRYING OUT THE INVENTION

Hereinafter, embodiments of the present invention will be described with reference to the drawings.

(First Embodiment)

Figure 1:
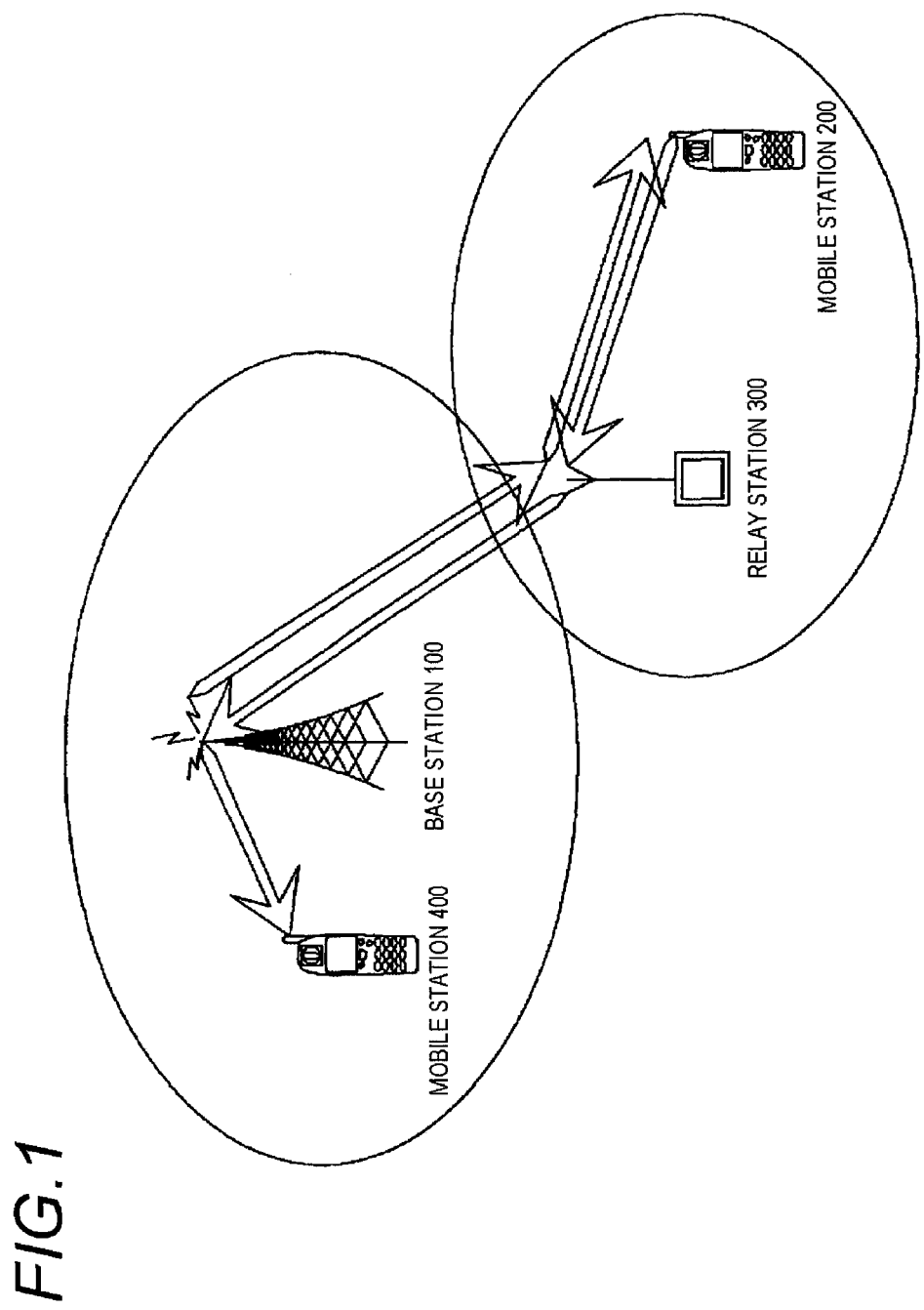
FIG. 1 is a schematic diagram illustrating a configuration of a relay system according to a first embodiment.

FIG. 1 is a schematic diagram illustrating a configuration of a relay system according to a first embodiment. As illustrated in FIG. 1, the relay system according to the first embodiment includes: a base station 100; mobile stations 200 and 400; and a relay station 300 located between the base station 100 and the mobile station 200. Note that the mobile station 200 is subordinate to the relay station, and the mobile station 400 is subordinate to the base station 100. The mobile station 200 communicates with the base station 100 via the relay station 300.

Note that in the present embodiment, the relay station 300 carries out time division relay (TD relay). Further, in the present embodiment, time division duplex (TDD) is used for communication between the base station 100 and the relay station 300 and communication between the relay station 300 and the mobile station 200.

Note that in the present embodiment, a frequency bandwidth used for communication between the base station 100 and the mobile station 400 subordinate thereto is the same as a frequency bandwidth used for communication between the base station 100 and the relay station 300 (In band relay). Moreover, a frequency bandwidth used for communication between the relay station 300 and the mobile station 200 is the same as the frequency bandwidth used for communication between the base station 100 and the relay station 300 and the frequency bandwidth used for communication between the base station 100 and the mobile station 400 subordinate thereto.

Note that in the present embodiment, data is relayed through two hops from the base station 100 to the relay station 300 and from the relay station 300 to the mobile station 200.

Note that control signals in the present embodiment mean PDCCH, PHICH and/or PCFICH. The control signals are transmitted by being distributed on a frequency axis. The base station 100 makes a blind determination to detect, from the distributed control signals, the control signal to be sent to the base station 100, and performs a process for receiving the control signal. PDCCH is used for notification of allocation of PDSCH (downlink (DL) data or the like), notification of allocation of PUSCH (uplink (UL) data), and notification of a transmission power control command for PUSCH and/or PUCCH. PDCCH is mapped within first to third head OFDM symbols. The number of OFDM symbols of the control signal depends on the number of OFDM symbols of PDCCH, and therefore, the value of PCFICH serves as the number of OFDM symbols of the control signal. It is to be noted that when a service bandwidth is 10 RB or less, the number of OFDM symbols of PDCCH is two to four. Further, PDCCH for an MBSFN subframe has one or two OFDM symbols, and therefore, the relay station 300 transmits, as the control signal, one or two OFDM symbols to the mobile station 200. In the present embodiment, an example in which the control signal transmitted by the relay station 300 is provided by two OFDM symbols is mainly described.

One feature of the relay system according to the present embodiment is that resources, allocated between the relay station 300 and the base station 100, are partially allocated between the relay station 300 and the mobile station 200. Thus, suitable allocation of resources to each station is enabled depending on traffic.

Figure 2:
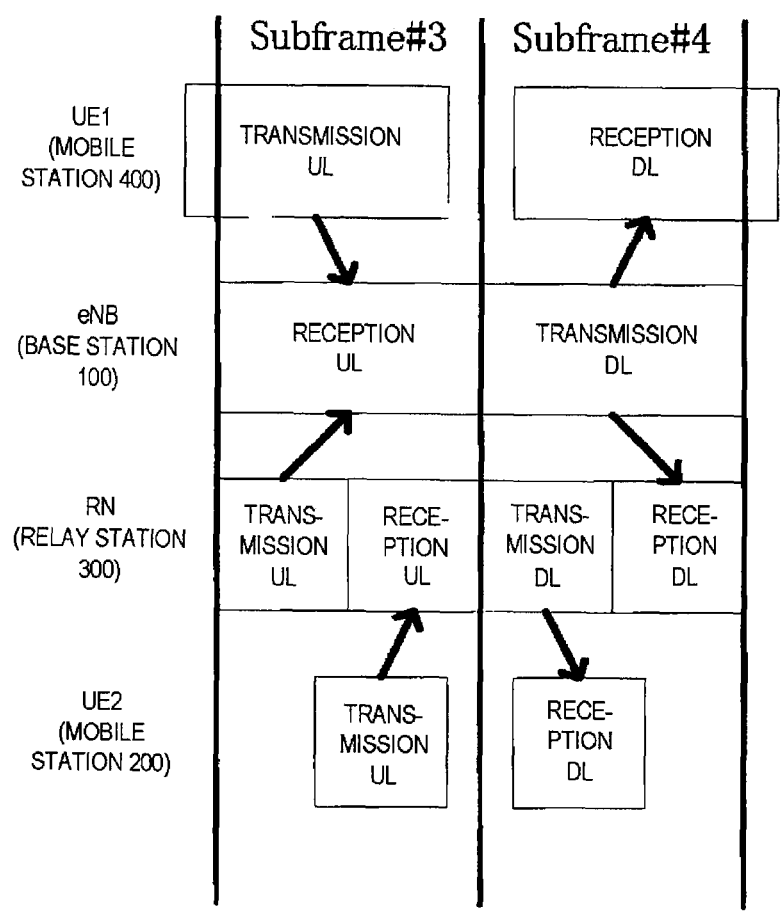
FIG. 2 is a diagram for describing subframe transmission/reception switching in the relay system according to the first embodiment.

Referring to FIGS. 1 and 2, a resource allocation method in the relay system according to the present embodiment will be described. FIG. 2 is a diagram for describing subframe transmission/reception switching in the relay system according to the present embodiment. As illustrated in FIG. 2, a subframe #3 is allocated to an uplink (UL), and a subframe #4 is allocated to a downlink (DL).

The base station 100 receives uplink (UL) data (hereinafter referred to as "UL data") using the subframe #3, and transmits downlink (DL) data (hereinafter referred to as "DL data") using the subframe #4.

The relay station 300 divides the subframe so as to transmit UL data to the base station 100 using the former half of the subframe #3 and to receive UL data from the mobile station 200 using the latter half of the subframe #3. The relay station 300 is switched from transmission to reception within the subframe. Note that transmission/reception switching timing within the subframe will be described later.

The mobile station 200 sends data to the relay station using only the latter half of the subframe. The relay station transmits downlink (DL) data to the mobile station using the former half of the subframe #4, and receives downlink (DL) data from the base station 100 using the latter half of the subframe #4.

[Transmission/Reception Switching in Relay Station 300]

Figure 3:
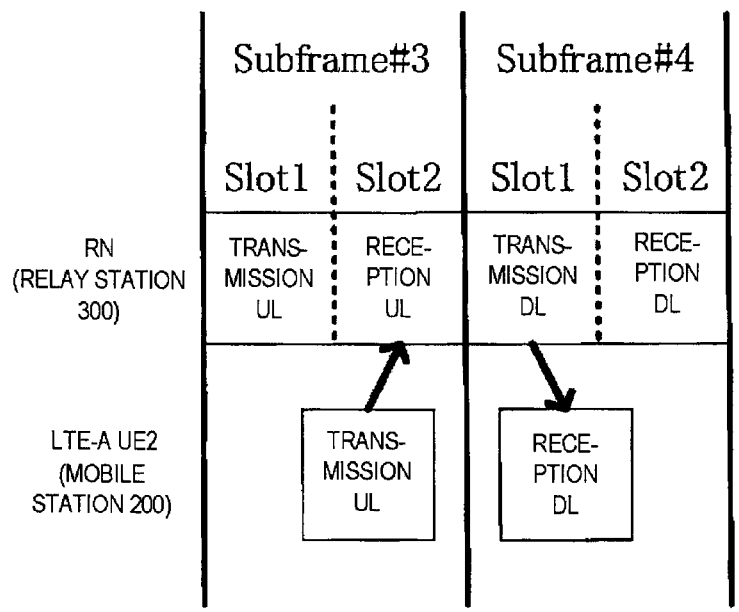
FIG. 3 is a diagram for describing Example 1 of transmission/reception switching timing in a relay station 300.

Next, referring to FIGS. 3 and 4, transmission/reception switching timing in the relay station 300 will be described. Referring to FIG. 3, an example in which switching is performed using a slot (half of a subframe) serving as a unit for half of the subframe will be described. FIG. 3 is a diagram for describing Example 1 of transmission/reception switching timing in the relay station 300.

As illustrated in FIG. 3, the subframes #3 and #4 are each divided into a former-half slot 1 and a latter-half slot 2, and transmission/reception switching in the relay station 300 is performed on a slot-by-slot basis. When transmission/reception switching in the relay station 300 is performed on a slot-by-slot basis, the relay station 300 is allowed to decide the location or the like of a reference signal (RS) in addition to the downlink (DL) and the uplink (UL) in accordance with a slot allocation rule. Therefore, the relay station 300 is capable of transmitting data while suppressing interference of other cells for the reference signal (RS).

Next, referring to FIG. 4, an example in which transmission/reception switching in the relay station 300 is performed using any given symbol within a subframe will be described. FIG. 4 is a diagram for describing Example 2 of transmission/reception switching timing in the relay station 300. In this example, since communication is performed via time division duplex (TDD) in the relay system of the present embodiment, transmission/reception switching performed in the relay station 300 by using any given symbol is equivalent to transmission/reception switching performed in the relay station 300 at any given time.

Figure 4:
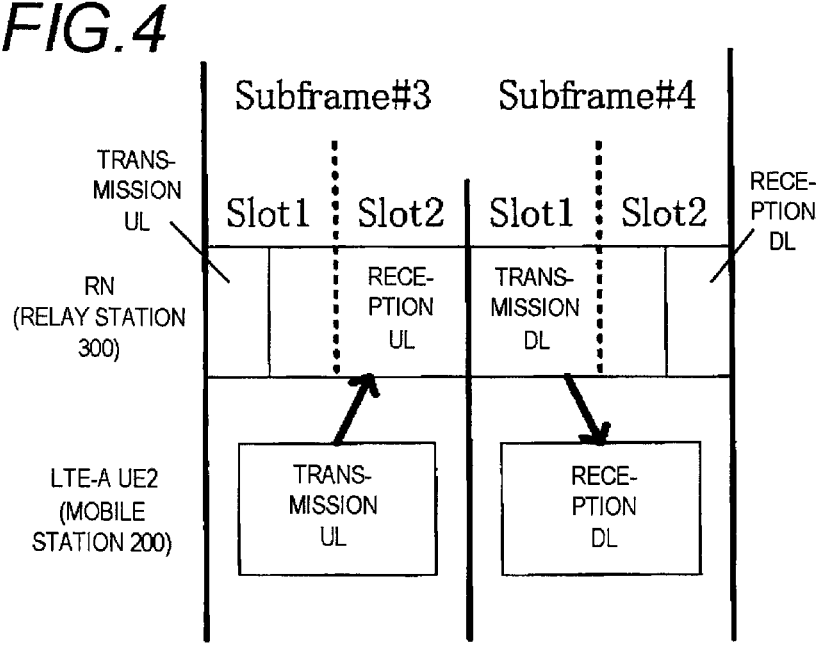
FIG. 4 is a diagram for describing Example 2 of transmission/reception switching timing in the relay station 300.

As illustrated in FIG. 4, irrespective of slots, transmission/reception switching in the relay station 300 is performed by using any given symbol within slots of the subframes #3 and #4. When transmission/reception switching is performed in the relay station 300 by using any given symbol, allocation of resources may be flexibly changed in accordance with the amount of traffic. Note that in Example 2 illustrated in FIG. 4, the amount of traffic between the relay station 300 and the base station 100 is small, and the amount of traffic between the relay station 300 and the mobile station 200 is large.

[Subframe Allocation Method]

When subframe allocation is performed, the base station 100 notifies the relay station 300 of (1) the position of a subframe through which transmission/reception switching is performed, and (2) the position of an OFDM symbol used for transmission/reception switching.

(Subframe Notification Pattern 1)

The base station 100 notifies the relay station 300 of the use of part of OFDM symbols (SC symbols) for each subframe to be used. In the case of the uplink (UL), subframe allocation notification is provided to the relay station 300 from the base station 100 in advance of 4 subframes and subframes for a processing amount necessary for the relay station 300. Further, in the case of the downlink (DL), subframe allocation notification is provided to the relay station 300 from the base station 100 in advance of subframes for a processing amount necessary for the relay station 300. Furthermore, information of the subframe allocated to switching is relayed from the base station 100 to the mobile station 200 by the relay station 300.

(Subframe Notification Pattern 2)

The base station 100 notifies the relay station 300 of the use of part of OFDM symbols (SC symbols) in a given cycle (e.g., for every 8 subframes) by using a broadcast signal (which is like SIB) intended for the relay station. Until the relay station 300 is notified of a change from the base station 100, the relay station 300 uses the subframe, which appears in a given cycle, to perform subframe division in transmitting/receiving data. Further, similarly to Notification Pattern 1, information of the subframe allocated to switching is relayed from the base station 100 to the mobile station 200 by the relay station 300.

(OFDM Symbol Notification Pattern 1)

When the number of OFDM symbols for switching is determined on a slot-by-slot basis, no particular instruction is necessary. The relay station 300 and the mobile station 200 perform switching on a slot-by-slot basis using the subframe for which a switching instruction is given.

(OFDM Symbol Notification Pattern 2)

When the number of OFDM symbols for switching is variable, in the case of the uplink (UL), the base station 100 notifies the relay station 300 of the number of OFDM symbols in advance of 4 subframes and subframes for a processing amount necessary for the relay station 300. This is because in the case of the uplink (UL), when allocation information for the mobile station 200 is transmitted in advance of 4 or more subframes, the mobile station 200 is operated in response to this so as to allow the information to be transmitted via the uplink (UL). Furthermore, in the case of the downlink (DL), the base station 100 notifies the relay station 300 of the number of OFDM symbols in advance of subframes for the processing amount necessary for the relay station 300.

Using the control signal such as PDCCH, the relay station 300 notifies the mobile station 200 of the number of OFDM symbols along with resource block (RB) to be allocated.

(Fixation of the Number of OFDM Symbols)

When the number of OFDM symbols for switching is fixed, the base station 100 notifies the relay station 300 of the number of OFDM symbols for switching at a time using a broadcast signal or the like.

Figure 5:
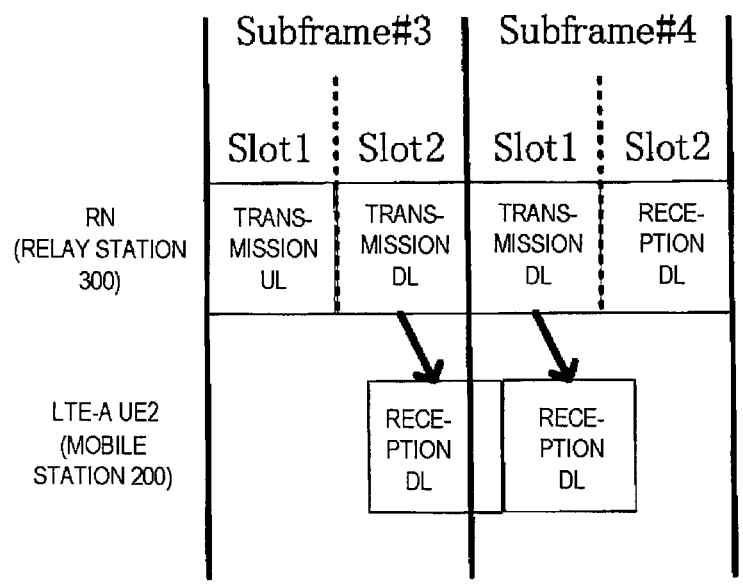
FIG. 5 is a diagram for describing Example 1 of subframe allocation.
Figure 6:
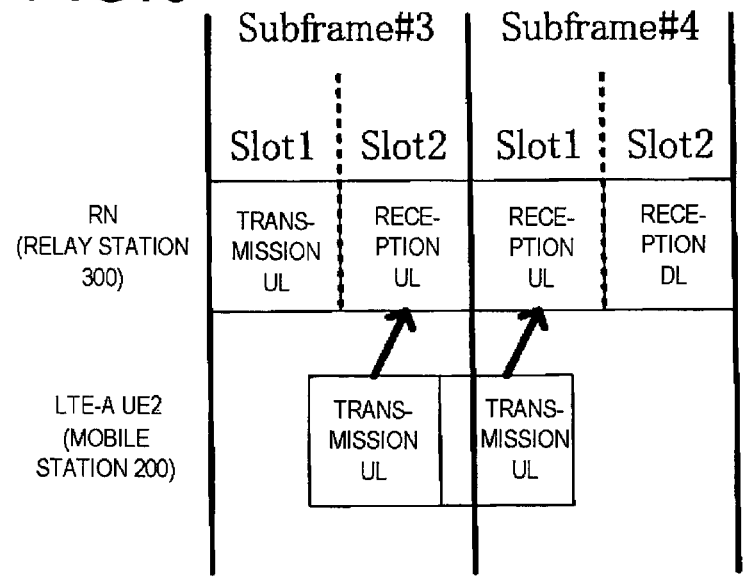
FIG. 6 is a diagram for describing Example 2 of subframe allocation.

Referring to FIGS. 5 and 6, subframe allocation examples will be described. FIG. 5 is a diagram for describing Example 1 of subframe allocation, and FIG. 6 is a diagram for describing Example 2 of subframe allocation. FIGS. 5 and 6 each illustrate an allocation method that is particularly effective when the amount of traffic in the downlink (DL) of the mobile station 200 is large.

As illustrated in FIG. 5, subframe allocation may be performed so that the relay station 300 transmits DL data to the mobile station 200 using both of the subframe #3 serving as an uplink subframe and the subframe #4 serving as a downlink subframe. Alternatively, as illustrated in FIG. 6, subframe allocation may be performed so that the relay station 300 receives UL data from the mobile station 200 using both of the subframe #3 serving as an uplink subframe and the subframe #4 serving as a downlink subframe.

Figure 7:
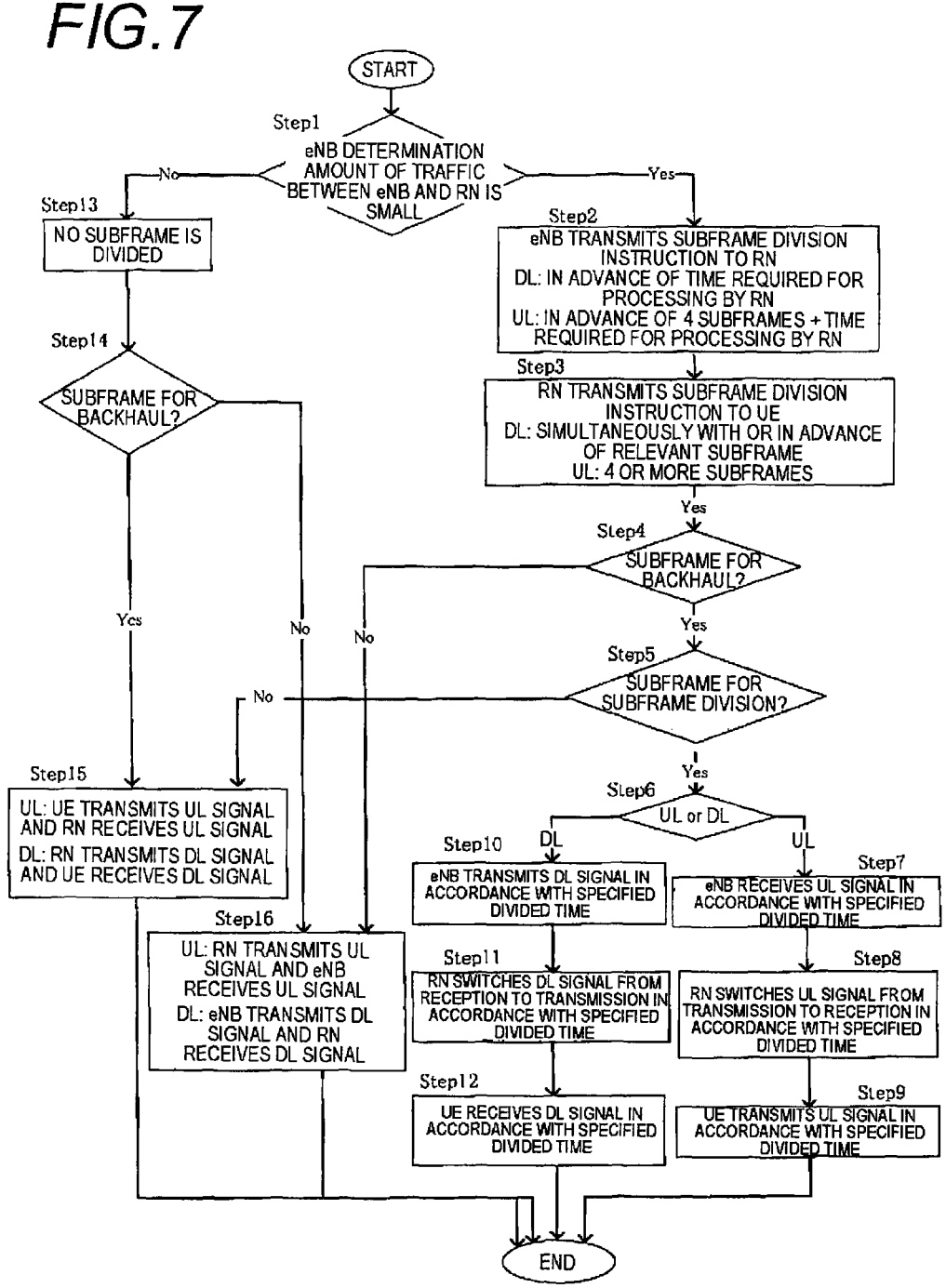
FIG. 7 is a flow chart for operations of respective stations in the first embodiment.

Next, referring to FIG. 7, operations of the respective stations for subframe transmission/reception switching in the present embodiment will be described. FIG. 7 is a flow chart for operations of the respective stations in the first embodiment. Hereinafter, for the sake of description of FIG. 7, the base station 100, the relay station 300 and the mobile station 200 will be simply referred to as "eNB", "RN", and "UE", respectively.

In Step 1, eNB predicts the amount of traffic between eNB and RN; then, upon determination that the amount of traffic between eNB and RN is small, the processing goes to Step 2, and upon determination that the amount of traffic between eNB and RN is large, the processing goes to Step 13.

In Step 2, eNB sends allocation information (division instruction) to RN in order to instruct RN to divide a subframe into one used for communication between eNB and RN and one used for communication between RN and UE in the designated subframe.

Note that in Step 2, when a DL subframe is to be divided, eNB transmits the division instruction to RN in advance in accordance with the time required for processing and relaying of an instruction signal by RN. Further, when an UL subframe is to be divided, eNB transmits the division instruction to RN in advance in accordance with a sum of 4 subframes and the time required for processing and relaying of an instruction signal by RN. When eNB transmits the division instruction, eNB may transmit the division instruction for each subframe to be divided, or may provide the instruction to RN by a broadcast signal. Alternatively, eNB may provide the instruction to RN so that a subframe to be divided is provided in a given cycle during a given period of time.

Subsequently, in Step 3, upon reception of the allocation information including an instruction for subframe division from eNB, RN transmits allocation information serving as a subframe division instruction to UE.

Note that in Step 3, when a DL subframe is to be divided, RN transmits the allocation information, serving as a subframe division instruction, to UE simultaneously with or in advance of the relevant subframe. Further, when an UL subframe is to be divided, RN transmits the allocation information, serving as a subframe division instruction, to UE in advance of 4 or more subframes.

In Step 4, when the relevant subframe is a subframe for backhaul serving as a communication link between RN and eNB, the processing goes to Step 5, and when the relevant subframe is a subframe that is not for backhaul, the processing goes to Step 16.

In Step 5, when the relevant subframe is a subframe for which the subframe division instruction is provided, the processing goes to Step 6, and when the relevant subframe is not a subframe for which the subframe division instruction is provided, the processing goes to Step 15.

In Step 6, when the relevant subframe is an uplink (UL), the processing goes to Step 7, and when the relevant subframe is a downlink (DL), the processing goes to Step 10.

In Step 7, eNB receives an uplink (UL) signal (UL data) in accordance with a specified divided time. Specification of the divided time may be made in a system in advance or may be transmitted as allocation information for each subframe to be divided.

In Step 8, RN switches an uplink (UL) signal from transmission to reception in accordance with a specified divided time.

In Step 9, UE transmits an uplink (UL) signal in accordance with a specified divided time.

In Step 10, eNB transmits a downlink (DL) signal in accordance with a specified divided time.

In Step 11, RN switches a downlink (DL) signal from reception to transmission in accordance with a specified divided time.

In Step 12, UE receives a downlink (DL) signal in accordance with a specified divided time.

In Step 13, no subframe is divided because the amount of traffic between eNB and RN, predicted by eNB, is large.

In Step 14, when the relevant subframe is a subframe for backhaul (between RN and eNB), the processing goes to Step 15, and when the relevant subframe is a subframe that is not for backhaul, the processing goes to Step 16.

In Step 15, when the relevant subframe is an uplink (UL), RN transmits an uplink (UL) signal and eNB receives the uplink (UL) signal. When the relevant subframe is a downlink (DL), eNB transmits a downlink (DL) signal and RN receives the downlink (DL) signal.

In Step S16, when the relevant subframe is an uplink (UL), UE transmits an uplink (UL) signal and RN receives the uplink (UL) signal. When the relevant subframe is a downlink (DL), RN transmits a downlink (DL) signal and UE receives the downlink (DL) signal.

Figure 8:
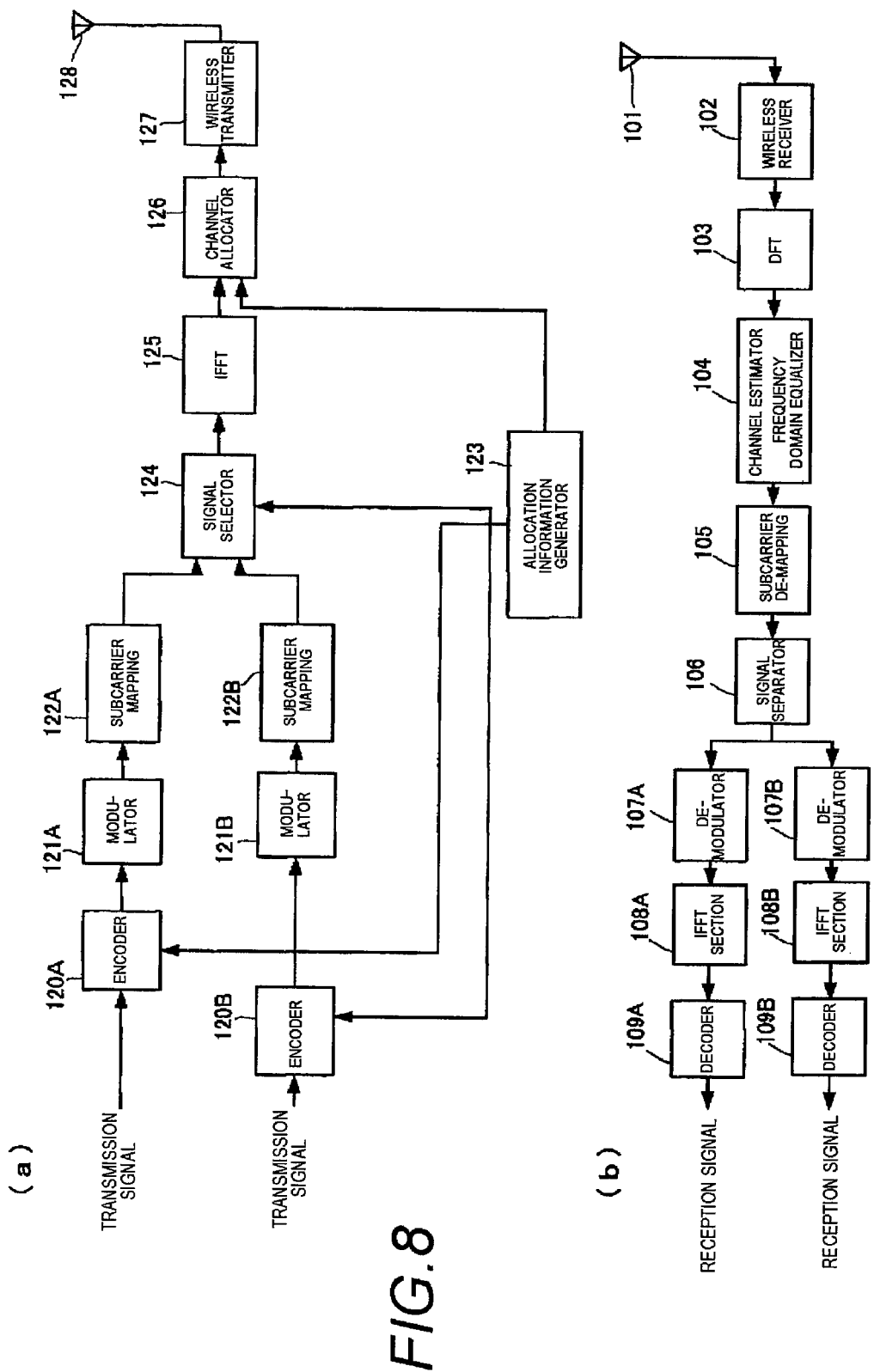
FIGS. 8(a) and 8(b) are block diagrams illustrating a configuration of a base station 100.

Next, referring to (a) and (b) in FIG. 8, a configuration of the base station 100 according to the first embodiment will be described. In FIG. 8, (a) and (b) are block diagrams of the base station 100. Note that in the base station 100, a reception scheme is SC-FDMA, and a transmission scheme is OFDM. The base station 100 illustrated in (a) and (b) in FIG. 8 includes: a reception antenna 101; a wireless receiver 102; a DFT 103; a channel estimator/frequency domain equalizer 104; a subcarrier de-mapping section 105; a signal separator 106; demodulators 107A and 107B; IFFT sections 108A and 108B; decoders 109A and 109B; encoders 120A and 120B; modulators 121A and 121B; subcarrier mapping sections 122A and 122B; an allocation information generator 123; a signal selector 124; an IFFT section 125; a channel allocator 126; a wireless transmitter 127; and a transmission antenna 128. In FIG. 8, (a) illustrates the transmission side of the base station 100. In FIG. 8, (b) illustrates the reception side of the base station 100.

The wireless receiver 102 receives a signal from the mobile station 200 via the reception antenna 101, performs wireless processing such as downconverting on the signal, and outputs, to the DFT (Discrete Fourier Transform) 103, the signal which has been received from the mobile station 200 and on which the wireless processing has been performed.

The DFT 103 performs discrete Fourier transform processing on the signal, processed by the wireless receiver 102, so as to convert a time signal into a frequency component, and outputs the resulting signal to the channel estimator/frequency domain equalizer 104.

The channel estimator/frequency domain equalizer 104 carries out channel estimation and frequency domain equalization by using a reference signal, and outputs, to the subcarrier de-mapping section 105, the signal that has been converted into a frequency component by the DFT 103.

The subcarrier de-mapping section 105 returns a signal mapped on a subcarrier to an original signal sequence, and outputs the resulting signal to the signal separator 106.

The signal separator 106 separates the signal, processed by the subcarrier de-mapping section 105, into a signal provided from the relay station 300 and a signal provided from the mobile station 200, and outputs the separated signals to the demodulators 107A and 107B.

The demodulator 107A demodulates the signal provided from the relay station 300 and separated by the signal separator 106, and outputs the resulting signal to the IFFT section 108A. The IFFT section 108A performs inverse fast Fourier transform processing on the signal, processed by the demodulator 107A, so as to convert a frequency axis signal into a time axis signal, and outputs the resulting signal to the decoder 109A. The decoder 109A decodes the signal processed by the IFFT section 108A, and outputs the resulting signal as a reception signal.

The demodulator 107B demodulates the signal provided from the mobile station 200 and separated by the signal separator 106, and outputs the resulting signal to the IFFT section 108B. The IFFT section 108B performs inverse fast Fourier transform processing on the signal, processed by the demodulator 107B, so as to convert a frequency axis signal into a time axis signal, and outputs the resulting signal to the decoder 109B. The decoder 109B decodes the signal processed by the IFFT section 108B, and outputs the resulting signal as a reception signal.

Based on the amount of traffic from the base station 100 to the relay station 300, the amount of traffic from the base station 100 to the mobile station 400 and the amount of traffic from the relay station 300 to the mobile station 200, the allocation information generator 123 decides whether or not a subframe should be divided. Then, the allocation information generator 123 generates subframe allocation information, and outputs the subframe allocation information to each of the encoders 120A and 120B, the signal selector 124 and the channel allocator 126.

Based on an instruction provided from the allocation information generator 123, the encoder 120A adjusts, in accordance with an OFDM symbol range, the number of symbols to be encoded, encodes a transmission signal intended for the relay station 300, and outputs the resulting signal to the modulator 121A. On the other hand, based on an instruction provided from the allocation information generator 123, the encoder 120B adjusts, in accordance with an OFDM symbol range, the number of symbols to be encoded, encodes a transmission signal intended for the mobile station 200, and outputs the resulting signal to the modulator 121B.

The modulator 121A modulates the transmission signal intended for the relay station 300 and processed by the encoder 120A, and outputs the resulting signal to the subcarrier mapping section 122A. On the other hand, the modulator 121B modulates the transmission signal intended for the mobile station 200 and processed by the encoder 120B, and outputs the resulting signal to the subcarrier mapping section 122B.

The subcarrier mapping section 122A maps the transmission signal, intended for the relay station 300 and processed by the modulator 121A, on a subcarrier, and outputs the resulting signal to the signal selector 124. On the other hand, the subcarrier mapping section 122B maps the transmission signal, intended for the mobile station 200 and processed by the modulator 121B, on a subcarrier, and outputs the resulting signal to the signal selector 124.

The signal selector 124 selects the transmission signal intended for the relay station 300 and the transmission signal intended for the mobile station 200, and outputs the selected signals to the IFFT section 125.

The IFFT section 125 performs inverse fast Fourier transform processing on each of the transmission signals, intended for the relay station 300 and the mobile station 200 and selected by the signal selector 124, so as to convert a frequency axis signal into a time axis signal, and outputs each of the resulting signals to the channel allocator 126.

The channel allocator 126 allocates allocation information and each transmission signal processed by the IFFT section 125 to a channel, and outputs the resulting signal to the wireless transmitter.

The wireless transmitter 127 performs wireless processing such as upconverting on each transmission signal processed by the channel allocator 126, and outputs the resulting signal to the relay station 300 via the transmission antenna 128.

Figure 9:
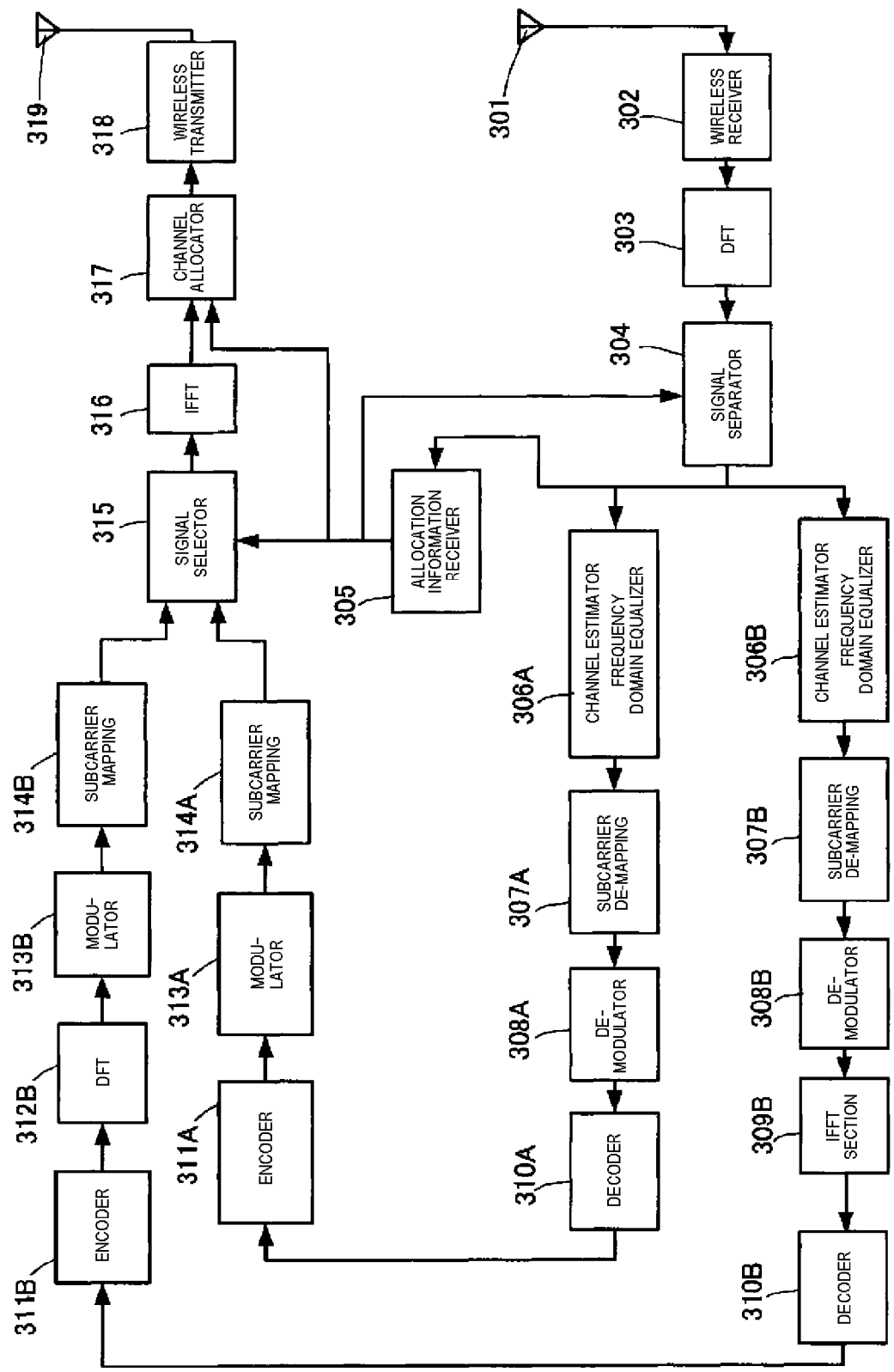
FIG. 9 is a block diagram illustrating a configuration of the relay station 300.

Next, referring to FIG. 9, a configuration of the relay station 300 will be described. FIG. 9 is a block diagram illustrating the configuration of the relay station 300. The relay station 300 illustrated in FIG. 9 includes: a reception antenna 301; a wireless receiver 302; a DFT 303; a signal separator 304; an allocation information receiver 305; channel estimators/frequency domain equalizers 306A and 306B; subcarrier de-mapping sections 307A and 307B; demodulators 308A and 308B; an IFFT section 309B; decoders 310A and 310B; encoders 311A and 311B; a DFT 312B; modulators 313A and 313B; subcarrier mapping sections 314A and 314B; a signal selector 315; an IFFT section 316; a channel allocator 317; a wireless transmitter 318; and a transmission antenna 319.

The wireless receiver 302 receives the transmission signal from the base station 100 via the reception antenna 301, performs wireless processing such as downconverting on the signal, and outputs, to the DFT (Discrete Fourier Transform) 303, the transmission signal which has been received from the base station 100 and on which the wireless processing has been performed.

The DFT 303 performs discrete Fourier transform processing on the signal, processed by the wireless receiver 302, so as to convert a time signal into a frequency component, and outputs the resulting signal to the signal separator 304.

From the transmission signal from the base station 100, the signal separator 304 separates allocation information, a relay signal provided from the base station 100, and a relay signal provided from the mobile station 200. Note that allocation information, which has been received at a time previous to this timing, is used for the separation.

The signal separator 304 outputs the separated allocation information to the allocation information receiver 305.

Further, the signal separator 304 outputs the separated relay signal, which has been provided from the base station 100, to the channel estimator/frequency domain equalizer 306A, and outputs the separated relay signal, which has been provided from the mobile station 200, to the channel estimator/frequency domain equalizer 306B.

Via the reception antenna 301, the allocation information receiver 305 receives information of a subframe which is allocated to the base station 100 and for which switching is to be performed, and the number of OFDM symbols for switching, and outputs the received information to the signal selector 315.

The channel estimator/frequency domain equalizer 306A carries out channel estimation and frequency domain equalization by using a reference signal, and outputs, to the subcarrier de-mapping section 307A, the relay signal that has been provided from the base station 100 and has been converted into a frequency component by the DFT 303. On the other hand, the channel estimator/frequency domain equalizer 306B carries out channel estimation and frequency domain equalization by using a reference signal, and outputs, to the subcarrier de-mapping section 307B, the relay signal that has been provided from the mobile station 200 and has been converted into a frequency component by the DFT 303.

The subcarrier de-mapping section 307A returns a signal mapped on a subcarrier to an original signal sequence, and outputs the resulting signal to the demodulator 308A. On the other hand, the subcarrier de-mapping section 307B returns a signal mapped on a subcarrier to an original signal sequence, and outputs the resulting signal to the demodulator 308B.

The demodulator 308A demodulates the signal provided from the base station 100 and processed by the subcarrier de-mapping section 307A, and outputs the resulting signal to the decoder 310A. On the other hand, the demodulator 308B demodulates the signal provided from the mobile station 200 and processed by the subcarrier de-mapping section 307B, and outputs the resulting signal to the IFFT section 309B.

The IFFT section 309B performs inverse fast Fourier transform processing on the signal, processed by the demodulator 308B, so as to convert a frequency axis signal into a time axis signal, and outputs the resulting signal to the decoder 310B.

The decoder 310A decodes the signal processed by the demodulator 308A, and outputs the resulting signal to the encoder 311A. On the other hand, the decoder 310B decodes the signal processed by the IFFT section 309B, and outputs the resulting signal to the encoder 311B.

The encoder 311A encodes the transmission signal intended for the base station 100, and outputs the resulting signal to the modulator 313A. On the other hand, the encoder 311B encodes the transmission signal intended for the mobile station 200, and outputs the resulting signal to the DFT 312B.

The DFT 312B performs discrete Fourier transform processing on the signal, processed by the encoder 311B, so as to convert a time signal into a frequency component, and outputs the resulting signal to the modulator 313B.

The modulator 313A modulates the transmission signal intended for the base station 100 and processed by the encoder 311A, and outputs the resulting signal to the subcarrier mapping section 314A. On the other hand, the modulator 313B modulates the transmission signal intended for the mobile station 200 and processed by the DFT 312B, and outputs the resulting signal to the subcarrier mapping section 314B.

The subcarrier mapping section 314A maps the transmission signal, intended for the base station 100 and processed by the modulator 313A, on a subcarrier, and outputs the resulting signal to the signal selector 315. On the other hand, the subcarrier mapping section 314B maps the transmission signal, intended for the mobile station 200 and processed by the modulator 313B, on a subcarrier, and outputs the resulting signal to the signal selector 315.

Based on and in accordance with the allocation information received by the allocation information receiver 305, the signal selector 315 selects a signal to be relayed to the base station 100 or a signal to be relayed to the mobile station 200, and outputs the selected signal to the IFFT section 316.

The IFFT section 316 performs inverse fast Fourier transform processing on the signal, selected to be relayed to the base station 100 or the mobile station 200 by the signal selector 315, so as to convert a frequency axis signal into a time axis signal, and outputs the resulting signal to the channel allocator 317.

The channel allocator 317 allocates allocation information and the transmission signal processed by the IFFT section 316 to a channel, and outputs the resulting signal to the wireless transmitter 318.

The wireless transmitter 318 performs wireless processing such as upconverting on the transmission signal processed by the channel allocator 317, and transmits the resulting signal to a relay destination (i.e., the base station 100 or the mobile station 200) via the transmission antenna 319.

Figure 10:
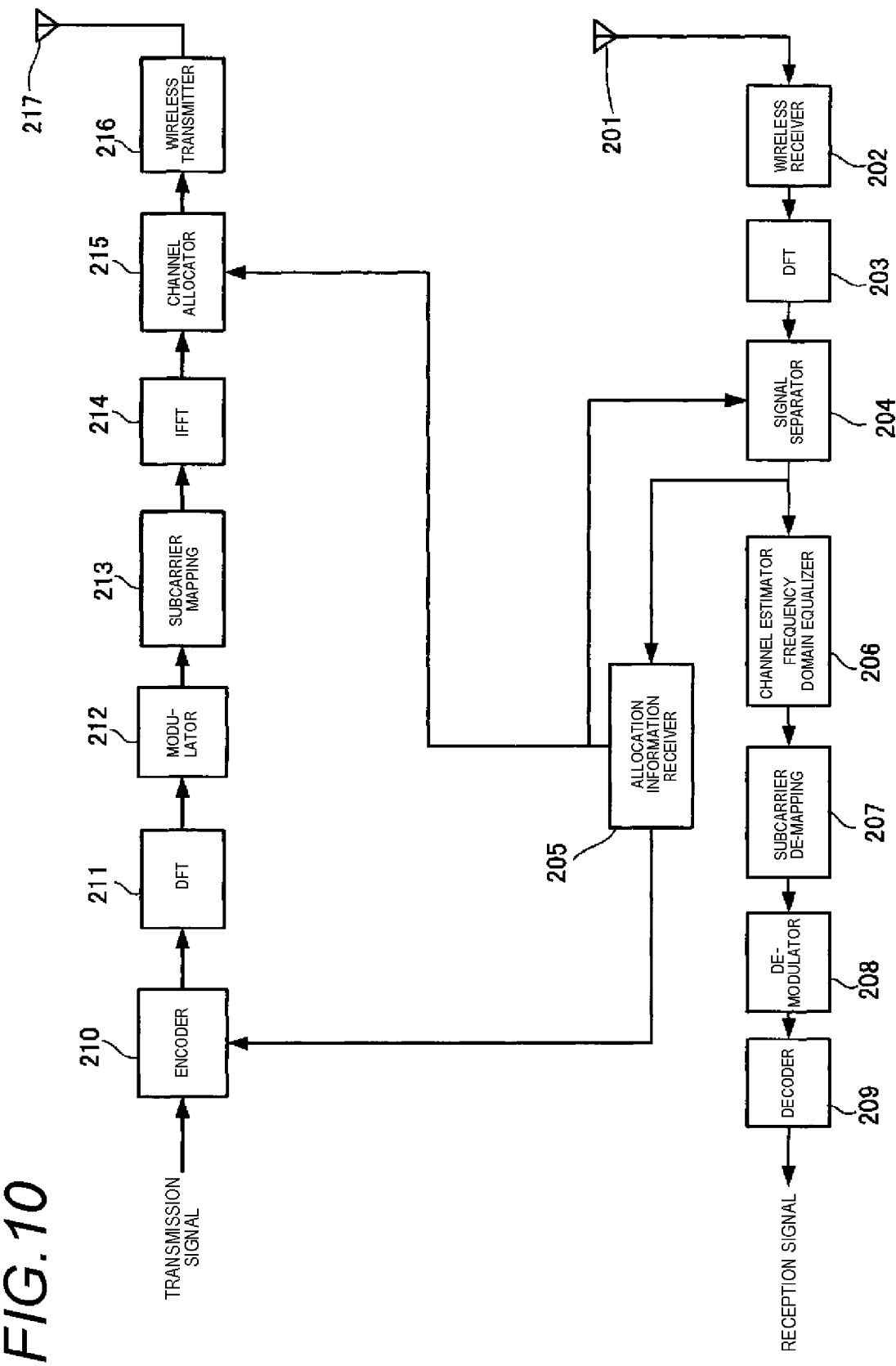
FIG. 10 is a block diagram illustrating a configuration of a mobile station 200.

Next, referring to FIG. 10, a configuration of the mobile station 200 will be described. FIG. 10 is a block diagram illustrating the configuration of the mobile station 200. The mobile station 200 illustrated in FIG. 10 includes: a reception antenna 201; a wireless receiver 202; a DFT 203; a signal separator 204; an allocation information receiver 205; a channel estimator/frequency domain equalizer 206; a subcarrier de-mapping section 207; a demodulator 208; a decoder 209; an encoder 210; a DFT 211; a modulator 212; a subcarrier mapping section 213; an IFFT section 214; a channel allocator 215; a wireless transmitter 216; and a transmission antenna 217.

The wireless receiver 202 receives the transmission signal from the relay station 300 via the reception antenna 201, performs wireless processing such as downconverting on the signal, and outputs, to the DFT (Discrete Fourier Transform) 203, the transmission signal which has been received from the relay station and on which the wireless processing has been performed.

The DFT 203 performs discrete Fourier transform processing on the signal, processed by the wireless receiver 202, so as to convert a time signal into a frequency component, and outputs the resulting signal to the signal separator 204.

From the transmission signal from the relay station 300, the signal separator 204 separates allocation information and a relay signal provided from the relay station 300. Note that allocation information, which has been received at a time previous to this timing, is used for the separation. The signal separator 204 outputs, to the allocation information receiver, the allocation information separated from the transmission signal provided from the relay station 300, and outputs, to the channel estimator/frequency domain equalizer 206, the relay signal provided from the relay station 300.

The allocation information receiver 205 outputs the allocation information, processed by the signal separator 204, to the encoder 210 and the channel allocator 215.

The channel estimator/frequency domain equalizer 206 carries out channel estimation and frequency domain equalization on the relay signal, provided from the relay station 300 and processed by the signal separator 204, by using a reference signal, and outputs the resulting signal to the subcarrier de-mapping section 207.

The subcarrier de-mapping section 207 returns a signal mapped on a subcarrier to an original signal sequence, and outputs the resulting signal to the demodulator 208.

The demodulator 208 demodulates the relay signal provided from the relay station 300 and processed by the subcarrier de-mapping section 207, and outputs the resulting signal to the decoder 209.

The decoder 209 decodes the signal processed by the demodulator 208, and outputs a reception signal.

The encoder 210 encodes the transmission signal intended for the relay station 300, and outputs the resulting signal to the DFT 211. Further, a subframe signal, which is included in the transmission signal intended for the relay station 300 and by which switching is to be performed, is encoded by the encoder 210 in accordance with the number of bits appropriate to the number of usable OFDM symbols.

The DFT 211 performs discrete Fourier transform processing on the signal, processed by the encoder 210, so as to convert a time signal into a frequency component, and outputs the resulting signal to the modulator 212.

The modulator 212 modulates the transmission signal intended for the relay station 300 and processed by the DFT 211, and outputs the resulting signal to the subcarrier mapping section 213.

The subcarrier mapping section 213 maps the transmission signal, intended for the relay station 300 and processed by the modulator 212, on a subcarrier, and outputs the resulting signal to the IFFT section 214.

The IFFT section 214 performs inverse fast Fourier transform processing on the transmission signal, intended for the relay station 300 and processed by the subcarrier mapping section 213, so as to convert a frequency axis signal into a time axis signal, and outputs the resulting signal to the channel allocator 215.

The channel allocator 215 allocates, to a channel, the allocation information outputted from the allocation information receiver 205 and the transmission signal processed by the IFFT section 214, and outputs the resulting signal to the wireless transmitter 216.

The wireless transmitter 216 performs wireless processing such as upconverting on the transmission signal processed by the channel allocator 215, and outputs the resulting signal to the relay station 300 via the transmission antenna 217.

Thus, the present embodiment is capable of implementing dynamic resource allocation between the relay station 300 and the base station 100 and between the relay station 300 and the mobile station 200 in accordance with a traffic state. Furthermore, effective utilization of resources, which have been unusable for transmission/reception, is enabled.

(Second Embodiment)

Figure 19:
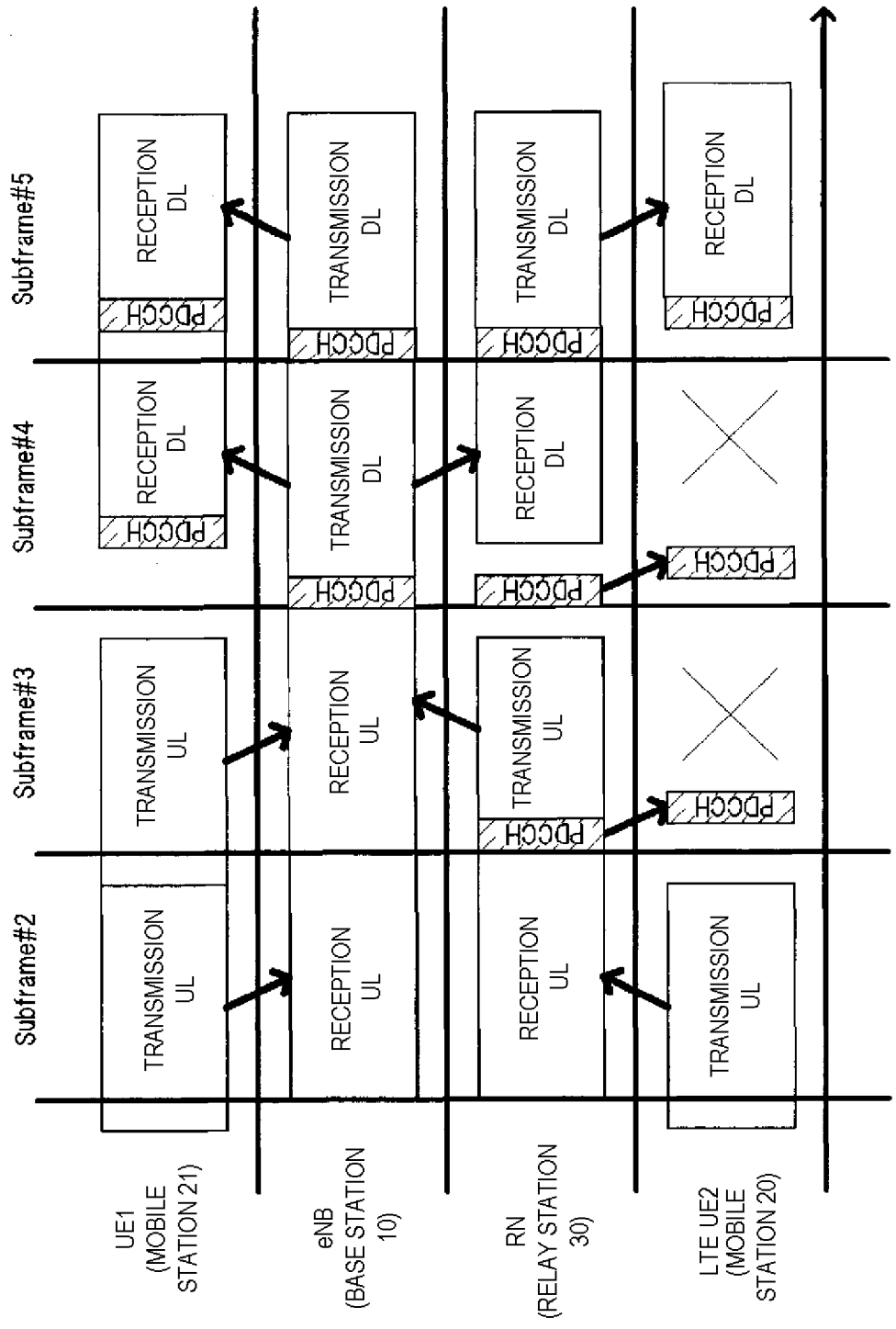
FIG. 19 is a diagram for describing another relay system in the related art.

A second embodiment is an example in which the base station 100, the mobile station 200 and the relay station 300, included in the relay system according to the first embodiment, are applied to a relay system in the related art illustrated in FIG. 19. Configurations of a base station, a mobile station and a relay station according to the second embodiment are similar to those of the base station, the mobile station and the relay station according to the first embodiment, and therefore, detailed description thereof will be omitted.

Note that the present embodiment is described on the assumption that a 3GPP LTE system is used. An LTE mobile station means a mobile station defined by Rel8 specifications, and an LTE-A mobile station means a mobile station defined by specifications developed after Rel8.

Note that in the present embodiment, the relay station 300 carries out time division relay (TD relay). Further, in the present embodiment, time division duplex (TDD) is used for communication between the base station 100 and the relay station 300 and communication between the relay station 300 and the mobile station 200.

Note that in the present embodiment, a frequency bandwidth used for communication between the base station 100 and the mobile station 400 subordinate thereto is the same as a frequency bandwidth used for communication between the base station 100 and the relay station 300 (In band relay). Moreover, a frequency bandwidth used for communication between the relay station 300 and the mobile station 200 is the same as the frequency bandwidth used for communication between the base station 100 and the relay station 300 and the frequency bandwidth used for communication between the base station 100 and the mobile station 400 subordinate thereto.

Note that in the present embodiment, data is relayed through two hops from the base station 100 to the relay station 300 and from the relay station 300 to the mobile station 200.

Note that control signals in the present embodiment mean PDCCH, PHICH and/or PCFICH. The control signals are transmitted by being distributed on a frequency axis. The base station 100 makes a blind determination to detect, from the distributed control signals, the control signal to be sent to the base station 100, and performs a process for receiving the control signal. PDCCH is used for notification of allocation of PDSCH (downlink (DL) data or the like), notification of allocation of PUSCH (uplink (UL) data), and notification of a transmission power control command for PUSCH and/or PUCCH. PDCCH is mapped within first to third head OFDM symbols. The number of OFDM symbols of the control signal depends on the number of OFDM symbols of PDCCH, and therefore, the value of PCFICH serves as the number of OFDM symbols of the control signal. It is to be noted that when a service bandwidth is 10 RB or less, the number of OFDM symbols of PDCCH is two to four. Further, PDCCH for an MBSFN subframe has one or two OFDM symbols, and therefore, the relay station 300 transmits, as the control signal, one or two OFDM symbols to the mobile station 200. In the present embodiment, an example in which the control signal transmitted by the relay station 300 is provided by two OFDM symbols is mainly described.

Figure 17:
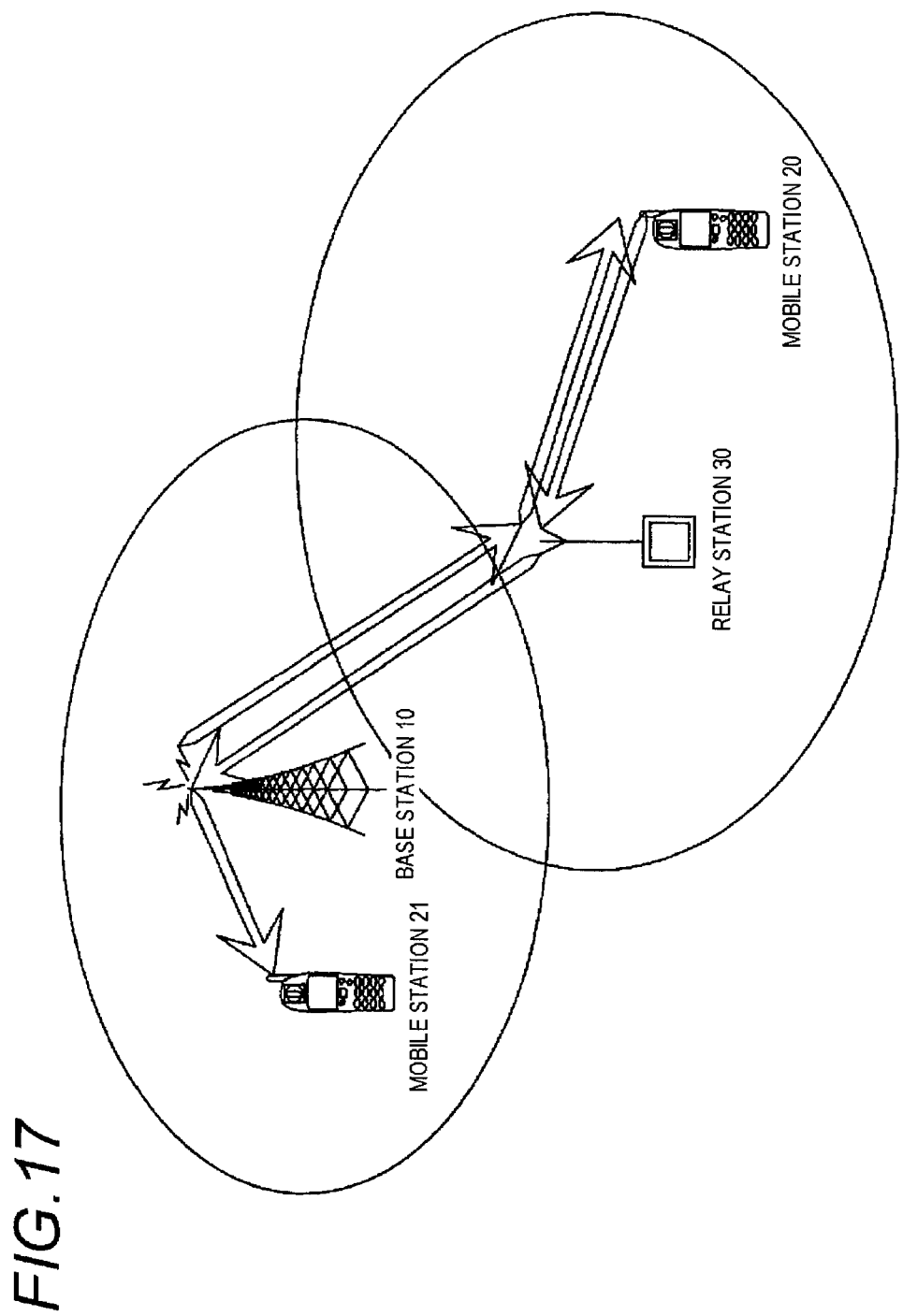
FIG. 17 is a schematic diagram illustrating an overall configuration of a relay system in the related art.
Figure 18:
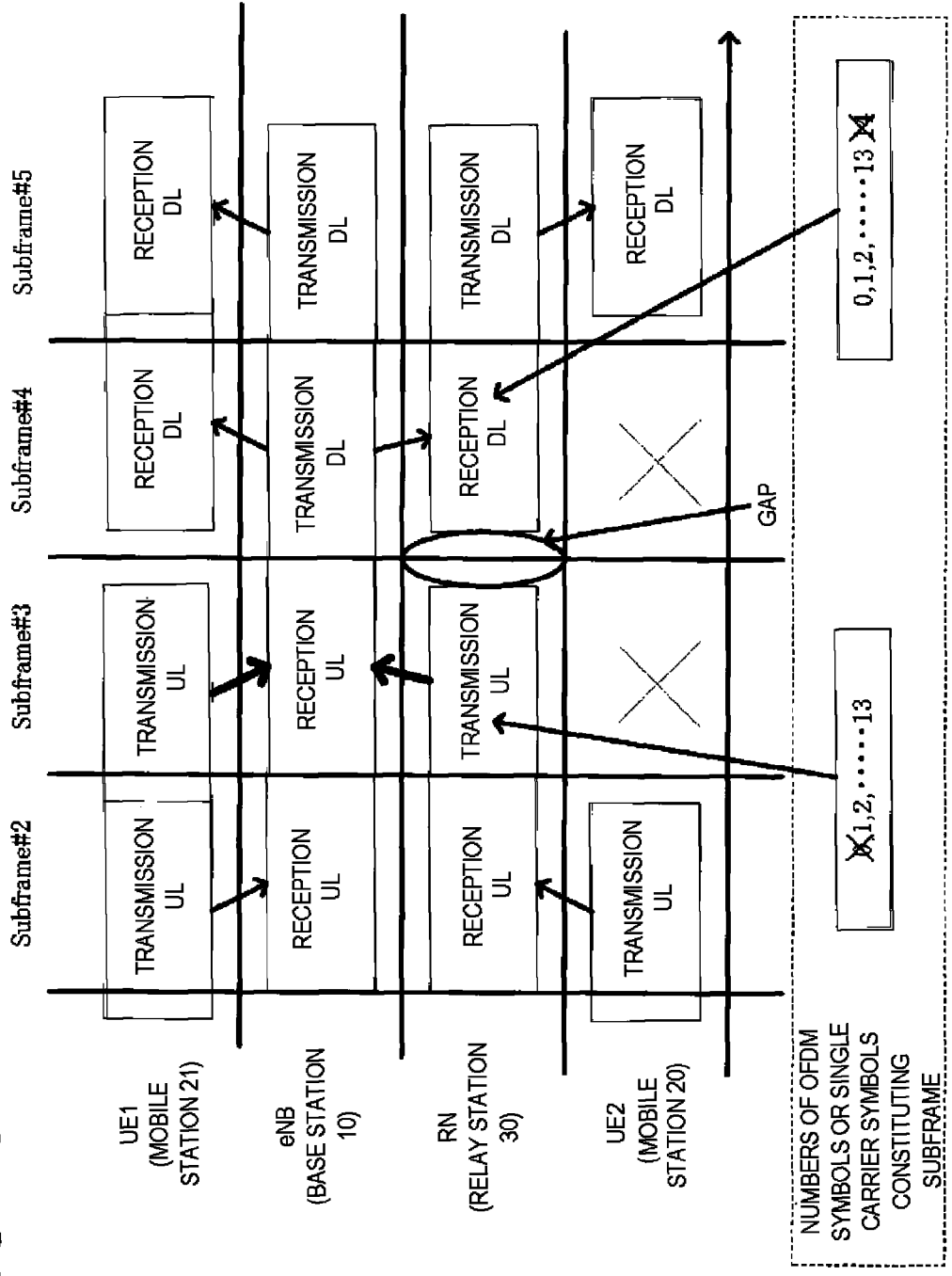
FIG. 18 is a conceptual diagram of a relay system in which a TDD system is applied to the relay system illustrated in FIG. 17.

Referring to FIG. 19, the relay system in the related art applied to the present embodiment will be described. Note that the relay system in the related art illustrated in FIG. 19 is the relay system disclosed in Non-Patent Literature 1. In this case, the relay system disclosed in Non-Patent Literature 1 is described on the assumption that for communication between the base station and relay station, DL subframes are used for both of an uplink (UL) and a downlink (DL). Further, the base station and relay station, included in the relay system illustrated in FIG. 19, are the same as the base station and relay station illustrated in FIG. 17. It is to be noted that a mobile station 20 subordinate to a relay station 30 is an LTE mobile station, and a mobile station 21 subordinate to a base station 10 is an LTE mobile station.

As illustrated in FIG. 19, in a cell of the base station 10, subframes #2 and #3 are set as uplink (UL) subframes, and subframes #4 and #5 are set as downlink (DL) subframes. On the other hand, in a cell of the relay station 30, the subframe #2 is set as an uplink (UL) subframe, and the subframes #3, #4 and #5 are set as downlink (DL) subframes.

In this embodiment, the subframes #3 and #4 of the relay station 30 are set as MBSFN subframes, and the LTE mobile station 20 determines that no data will be relayed thereto after reception of a control signal (PDCCH), and stops reception (subframe #3). Note that an MBSFN subframe is a subframe defined for transmission of a broadcast signal, but the LTE mobile station 20 does not have the function of receiving this subframe. Therefore, as for this subframe, processing such as measurement is also not performed for a signal other than a control signal. Accordingly, even when the relay station 30 uses the subframes #3 and #4 for communication with the base station 10, no adverse effect will be caused by measurement or the like.

The relay station 30 transmits UL data to the base station using the subframe #3, and receives DL data from the base station using the subframe #4. Deviations in the subframes occur due to the influence of transmission delay similarly to the first embodiment.

Figure 11:
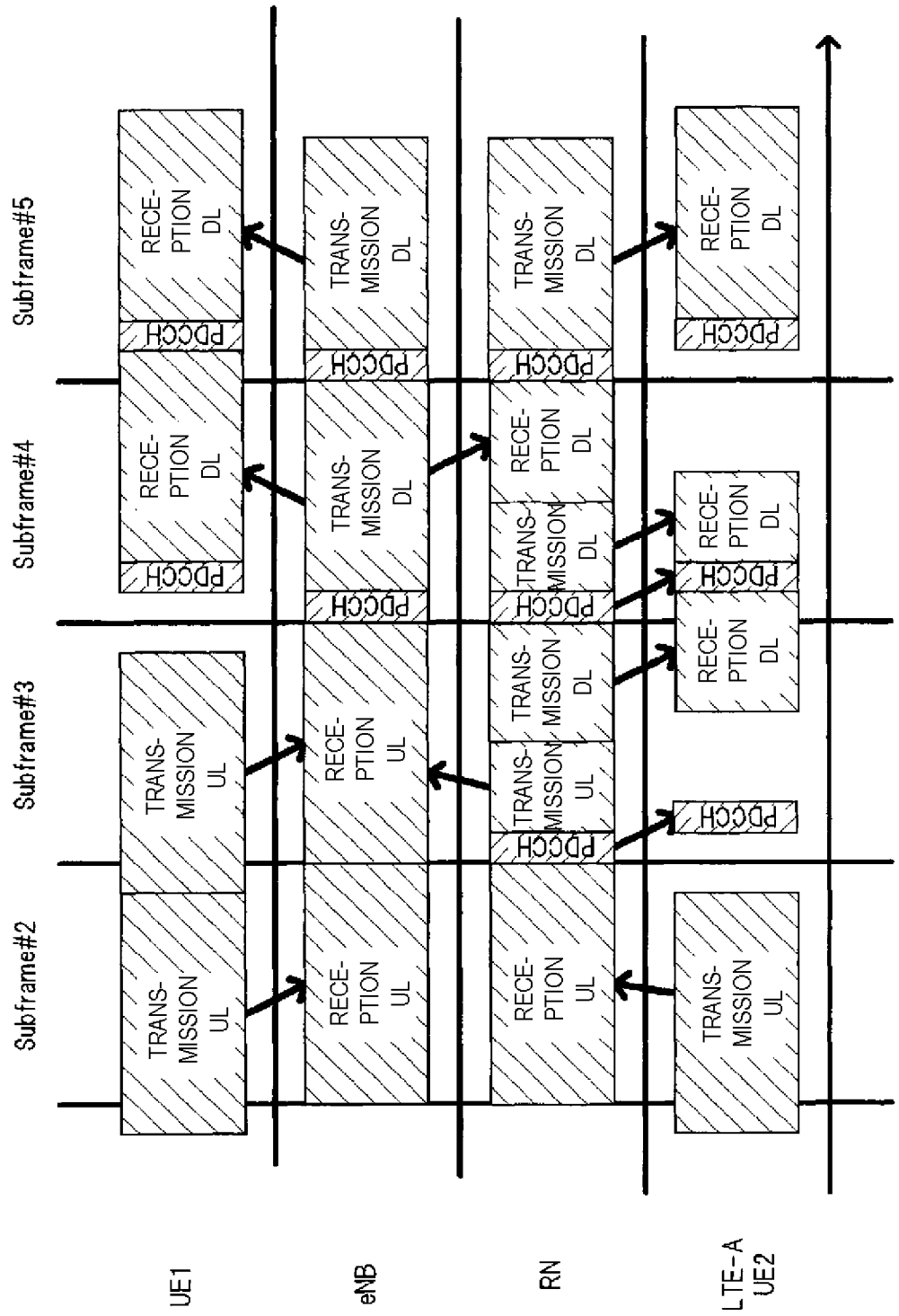
FIG. 11 is a diagram for describing Example 1 of subframe transmission/reception switching in a second embodiment.

Next, referring to FIGS. 11 and 12, description will be made about an example in which the base station 100, the mobile station 200 and the relay station 300, included in the relay system according to the first embodiment, are applied to the system in the related art described with reference to FIG. 19. FIG. 11 is a diagram for describing Example 1 of subframe transmission/reception switching in the second embodiment, and FIG. 12 is a diagram for describing Example 2 of subframe transmission/reception switching in the second embodiment.

In the example illustrated in FIG. 11, the relay station 300 divides each of the subframes #3 and #4 into two subframes. The relay station 300 transmits UL data to the base station 100 using the former half of the subframe #3, and the relay station 300 transmits DL data to the mobile station 200 using the latter half of the subframe #3. Further, the relay station 300 transmits DL data to the mobile station 200 using the former half of the subframe #4, and the relay station 300 receives DL data from the base station 100 using the latter half of the subframe #4. In this case, the mobile station 200 receives DL data from the relay station 300 using the subframes #3 and #4. Accordingly, the mobile station 200 can receive a downlink (DL) signal using the downlink (DL) subframe set by the relay station 300.

Figure 12:
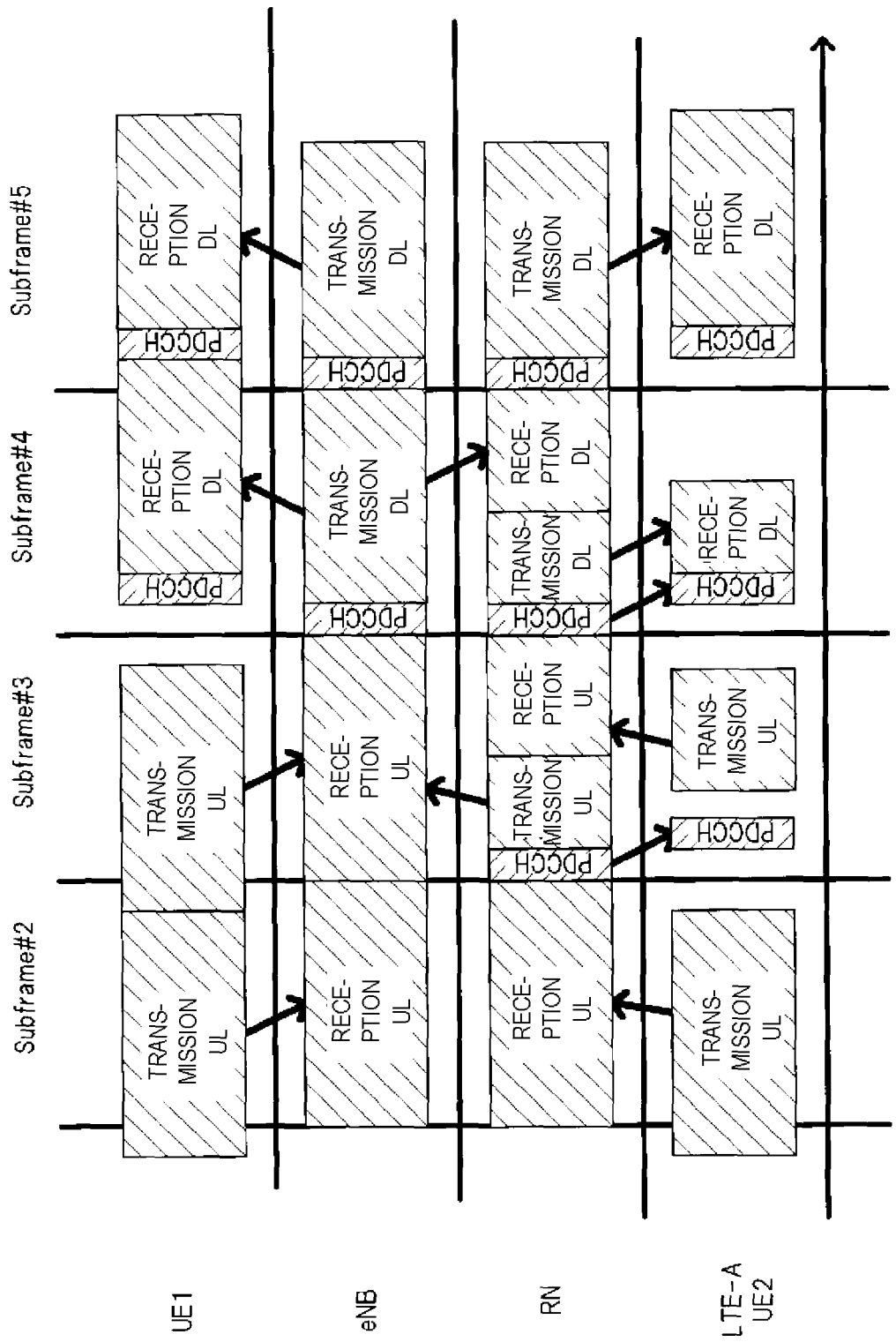
FIG. 12 is a diagram for describing Example 2 of subframe transmission/reception switching in the second embodiment.

In the example illustrated in FIG. 12, the relay station 300 divides each of the subframes #3 and #4 into two subframes similarly to the example illustrated in FIG. 11. The relay station 300 transmits UL data to the base station 100 using the former half of the subframe #3, and the relay station 300 receives UL data from the mobile station 200 using the latter half of the subframe #3. Further, the relay station 300 transmits DL data to the mobile station 200 using the former half of the subframe #4, and the relay station 300 receives DL data from the base station 100 using the latter half of the subframe #4. In this case, the mobile station 200 transmits uplink (UL) data using the subframe #3, and receives DL data using the subframe #4. Accordingly, for the subframe #3, the mobile station 200 transmits uplink (UL) data using the subframe set as the downlink (DL) by the relay station 300.

Figure 13:
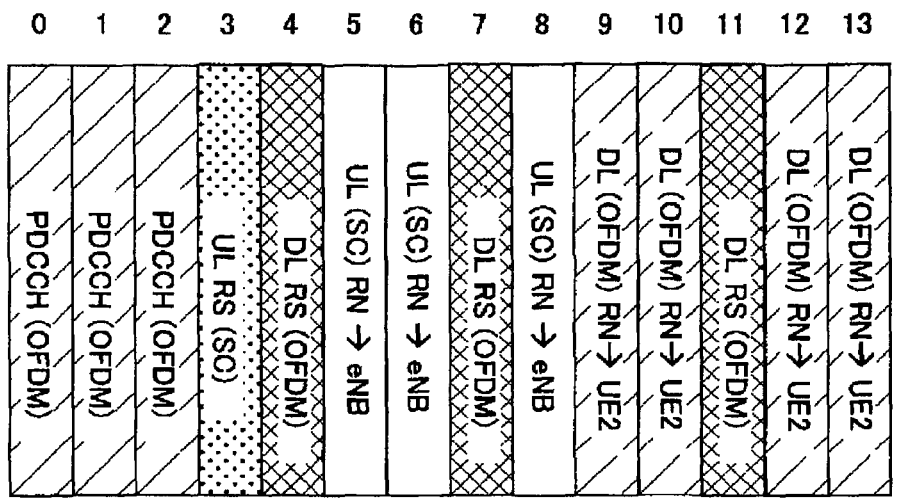
FIG. 13 is a diagram for describing Variation 1 of Example 1 of the subframe transmission/reception switching illustrated in FIG. 11.
Figure 14:
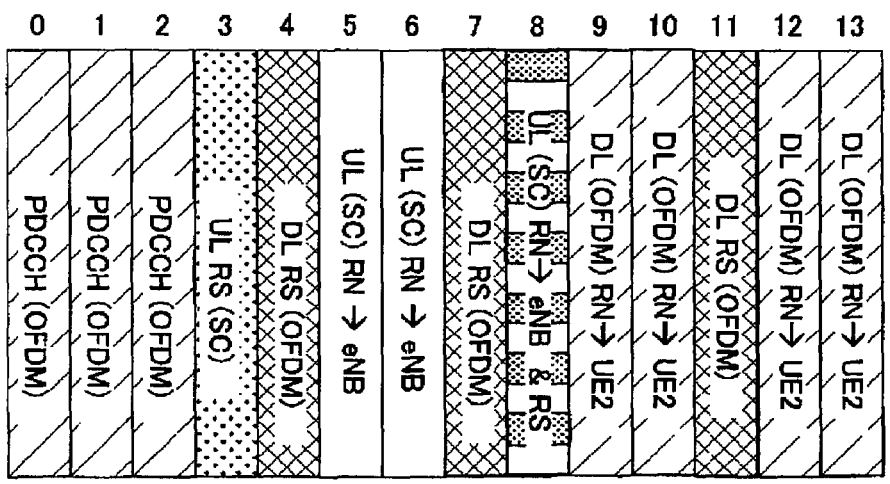
FIG. 14 is a diagram for describing Variation 2 of Example 1 of the subframe transmission/reception switching illustrated in FIG. 11.
Figure 15:
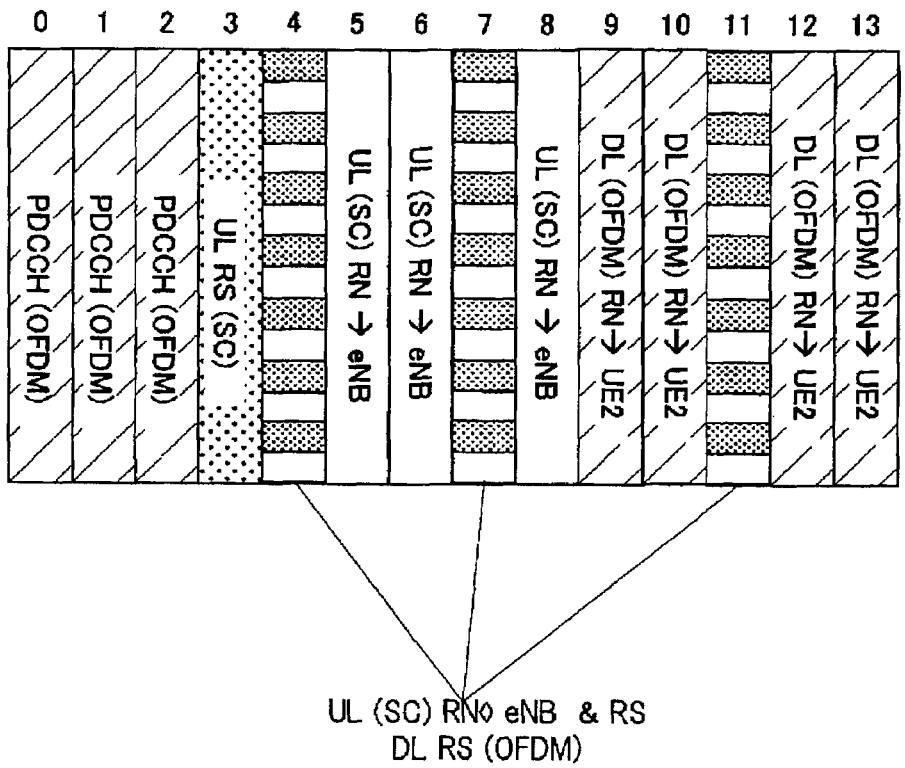
FIG. 15 is a diagram for describing Variation 3 of Example 1 of the subframe transmission/reception switching illustrated in FIG. 11.
Figure 16:
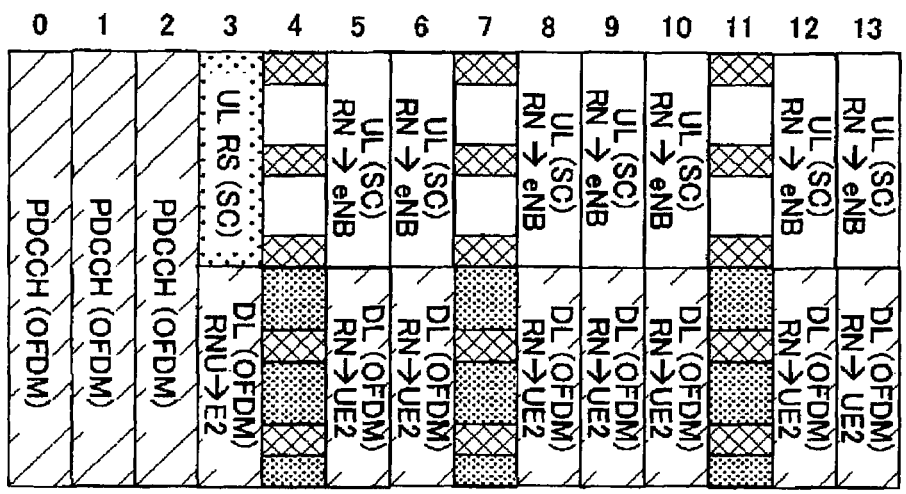
FIG. 16 is a diagram for describing Variation 4 of Example 1 of the subframe transmission/reception switching illustrated in FIG. 11.

Next, referring to FIGS. 13 to 16, Variations 1 to 4 of the example of subframe transmission/reception switching in the second embodiment will be described. FIG. 13 is a diagram for describing Variation 1 of Example 1 of the subframe transmission/reception switching illustrated in FIG. 11, and FIG. 14 is a diagram for describing Variation 2 of Example 1 of the subframe transmission/reception switching illustrated in FIG. 11. Further, FIG. 15 is a diagram for describing Variation 3 of Example 1 of the subframe transmission/reception switching illustrated in FIG. 11, and FIG. 16 is a diagram for describing Variation 4 of Example 1 of the subframe transmission/reception switching illustrated in FIG. 11. Note that the direction of each arrow in the diagrams indicates a transmission destination; for example, RN→eNB means that a transmission source is RN and a transmission destination is eNB. Furthermore, hereinafter, for the sake of description, the base station 100, the relay station 300 and the mobile station 200 may simply be referred to as "eNB", "RN", and "UE", respectively.

FIG. 13 illustrates a frame format in Variation 1 of Example 1 of the subframe transmission/reception switching illustrated in FIG. 11. Note that the relay station 300 sets a subframe #3 so as to allow LTE UE to carry out measurement. As illustrated in FIG. 13, using OFDM symbols (SC symbols) #4, #7 and #11, the relay station 300 transmits a downlink (DL) reference signal (RS). Further, using an OFDM symbol #3, the relay station 300 transmits an uplink (UL) reference signal (RS). These processes are performed in accordance with LTE specifications. Thus, the LTE mobile station is allowed to receive a reference signal (RS), and therefore, the subframe is allowed to be handled as a normal subframe without being set as an MBSFN subframe.

The position of an MBSFN subframe is determined by broadcast information and therefore cannot be frequently changed; however, when the subframe in the frame format illustrated in FIG. 13 is not set as an MBSFN subframe and is variably used for communication between RN and eNB or between RN and UE in accordance with the amount of traffic, the flexibility of resource allocation is further increased. Moreover, since resources may also be allocated to the LTE mobile station, this variation is further effective when the amount of traffic of the LTE mobile station is large. Furthermore, the relay station 300 transmits uplink (UL) data by using OFDM symbols #5, #6 and #8, and transmits downlink (DL) data by using OFDM symbols #9, #10, #12 and #13. The uplink (UL) data is transmitted in accordance with SC-FDM, and the downlink (DL) data is transmitted in accordance with OFDM.

FIG. 14 illustrates a frame format in Variation 2 of Example 1 of the subframe transmission/reception switching illustrated in FIG. 11. This frame format is capable of improving channel estimation accuracy for uplink (UL) data. Upon transmission of downlink (DL) data, the number of OFDM symbols by which transmission of an uplink (UL) reference signal (RS) is enabled is reduced. Therefore, the relay station 300 transmits an uplink (UL) reference signal (RS) and UL data to the base station 100 in a nested manner. Thus, since the reference signal (RS) and UL data may be transmitted by using the same symbol, an improvement in channel estimation accuracy is enabled.

FIG. 15 illustrates a frame format in Variation 3 of Example 1 of the subframe transmission/reception switching illustrated in FIG. 11. In this frame format, the relay station 300 transmits an uplink (UL) reference signal (RS), a downlink (DL) reference signal (RS) and UL data to the base station 100 in such a manner that allows the reference signals and data to be mixed. In this case, a downlink (DL) RS is transmitted to a RE (resource element) determined by LTE without change in a downlink (DL) RS format, and uplink (UL) data and RS are provided to the other RE. In a receiver of the base station 100, of signals that have been subjected to FFT, only an uplink (UL) subcarrier transmitted in accordance with SC is inputted to an equalizer. A downlink (DL) RS transmitted in accordance with OFDM is abandoned. Thus, since transmission of an uplink (UL) signal is also enabled using an OFDM symbol by which a downlink (DL) RS is transmitted, an improvement in resource utilization efficiency is enabled.

FIG. 16 illustrates a frame format in Variation 4 of Example 1 of the subframe transmission/reception switching illustrated in FIG. 11. In this frame format, a frame is divided into a RB (resource block) for uplink (UL) transmission and a RB for downlink (DL) transmission. It is to be noted that similarly to Variation 3, using an OFDM symbol by which a downlink (DL) RS is provided, a downlink (DL) RS is transmitted to a RE (resource element) determined by LTE without change in a downlink (DL) RS format, and uplink (UL) data and downlink (DL) data are provided to the other RE. When transmission is divided by using the RBs in this manner and attention is given to only the RB for downlink (DL) transmission, an LTE format is not changed, and therefore, allocation of downlink (DL) data to an LTE mobile station is also enabled.

As described above, the present embodiment is capable of implementing dynamic resource allocation between the relay station 300 and the base station 100 and between the relay station 300 and the mobile station 200 in accordance with a traffic state. Furthermore, effective utilization of resources, which have been unusable for transmission/reception, is enabled.

Note that each functional block used in the description of each of the foregoing embodiments is typically implemented as an LSI that is an integrated circuit. The functional blocks may be individually implemented on a single chip, or may be partially or entirely implemented on a single chip. In the present invention, each functional block is implemented as an LSI, which may also be referred to as "IC", "system LSI", "super LSI" or "ultra LSI" depending on a difference in packing density.

Note that a method for implementing an integrated circuit is not limited to LSI, but an integrated circuit may be implemented by a dedicated circuit or a general-purpose processor. An FPGA (Field Programmable Gate Array) which is programmable or a reconfigurable processor in which connection and setting of a circuit cell inside an LSI are reconfigurable may be utilized after LSI fabrication.

Moreover, when an integrated circuit implementation technique that replaces LSI makes its appearance due to an advance in semiconductor technology or an alternative technique derived therefrom, functional block integration may naturally be carried out using such a technique. Application of biotechnology or the like may be conceivable.

Note that the foregoing embodiments have been described on the assumption that an antenna is used, but an antenna port may also be similarly applied. An antenna port means a logical antenna formed by a single or a plurality of physical antennas. In other words, an antenna port does not necessarily mean a single physical antenna, but may mean an array antenna or the like formed by a plurality of antennas. For example, in LTE, the number of physical antennas by which an antenna port is formed is not specified, but an antenna port is specified as a minimum unit that allows a base station to transmit different reference signals. Further, an antenna port may be specified as a minimum unit by which a precoding vector weight is multiplied.

Although the present invention has been described in detail based on particular embodiments, it is apparent to those skilled in the art that various changes and modifications may be made without departing from the spirit and scope of the present invention.

The present application is based on Japanese Patent Application No. 2009-107992 filed on Apr. 27, 2009, the contents of which are incorporated herein by reference.

INDUSTRIAL APPLICABILITY

A wireless communication relay station apparatus, a wireless communication base station apparatus, a wireless communication mobile station apparatus and a wireless communication method according to the present invention have the effect of enabling dynamic resource allocation to each apparatus, and the apparatuses are useful as a relay station, a base station and a mobile station which perform wireless communication.

REFERENCE SIGNS LIST 100 base station
101, 201, 301 reception antenna
102, 202, 302 wireless receiver
103, 203, 211, 303, 312B DFT
104, 206, 306A, 306B channel estimator/frequency domain equalizer
105, 207, 307A, 307B subcarrier de-mapping section
106, 204, 304 signal separator
107A, 107B, 208, 308A, 308B demodulator
108A, 108B, 125, 214, 309B, 316 IFFT section
109A, 109B, 209, 310A, 310B decoder
120A, 120B, 210, 311A, 311B encoder
121A, 121B, 212, 313A, 313B modulator
122A, 122B, 213, 314A, 314B subcarrier mapping section
123 allocation information generator
124, 315 signal selector
126, 215, 317 channel allocator
127, 216, 318 wireless transmitter
128, 217, 319 transmission antenna
200, 400 mobile station
205, 305 allocation information receiver
300 relay station

The invention claimed is:

1. A radio communication relay station apparatus for relaying communication between a radio communication base station apparatus and a radio communication mobile station apparatus, the radio communication relay station apparatus comprising:
a receiver that is configured to receive data from the radio communication base station apparatus or the radio communication mobile station apparatus;
a transmitter that is configured to relay the received data to the radio communication base station apparatus or the radio communication mobile station apparatus; and
a selector that is configured to select the received data, in an uplink subframe or a downlink subframe, from: first data to be relayed from the relay station apparatus to the radio communication base station apparatus; second data to be relayed from the relay station apparatus to the radio communication mobile station apparatus; third data to be transmitted from the radio communication base station apparatus to the relay station apparatus; and fourth data to be transmitted from the radio communication mobile station apparatus to the relay station apparatus, wherein
the receiver is configured to receive allocation information for dividing the uplink subframe or the downlink subframe and switching transmission/reception between the divided uplink subframe or the divided downlink subframe in the relay station apparatus from the radio communication base station apparatus, and
the selector is configured to switch the first data and the fourth data, or the first data and the second data, between the divided uplink subframe in accordance with the allocation information received by the receiver, or
the selector is configured to switch the second data and the third data, or the fourth data and the third data, between the divided downlink subframe in accordance with the allocation information received by the receiver.

2. The radio communication relay station apparatus according to claim 1, wherein
the receiver is configured to receive the allocation information which has been set in a unit of slot being half of the uplink subframe or the downlink subframe from the radio communication base station apparatus, and
the selector is configured to switch allocation of each data in the uplink subframe or the downlink subframe on the slot basis in accordance with the allocation information received by the receiver.

3. The radio communication relay station apparatus according to claim 1, wherein
the receiver is configured to receive the allocation information which has been set in a unit of OFDM symbol from the radio communication base station apparatus in the uplink subframe or the downlink subframe, and
the selector is configured to switch allocation of each data in the uplink subframe or the downlink subframe on the OFDM symbol basis in accordance with the allocation information received by the receiver.

4. The radio communication relay station apparatus according to claim 1, wherein the transmitter transmits a downlink reference signal in a predetermined OFDM symbol in a subframe which is set to the uplink subframe in a first cell of the radio communication base station apparatus and set to the downlink subframe in a second cell of the radio communication relay station apparatus, when the selector switches the first data and the second data.

5. A radio communication base station apparatus for communicating with a radio communication mobile station apparatus via a radio communication relay station apparatus, the radio communication base station apparatus comprising:
an allocation information generator that is configured to:
determine whether an uplink subframe or a downlink subframe is to be divided or not, based on an amount of traffic of either between the base station apparatus and the radio communication relay station apparatus, between the base station apparatus and the radio communication mobile station apparatus or between the radio communication relay station apparatus and the radio communication mobile station apparatus, and
to generate allocation information for dividing the uplink subframe or the downlink subframe and switching transmission/reception between the divided uplink subframe or the divided downlink subframe in the radio communication relay station apparatus in accordance with a result of the determination; and
a transmitter that is configured to transmit data and the allocation information to the radio communication relay station apparatus.

6. The radio communication base station apparatus according to claim 5, wherein
the allocation information generator is configured to generate the allocation information for switching transmission/reception in the radio communication relay station apparatus in the uplink subframe or the downlink subframe on a slot basis or an OFDM symbol basis, when the result of the determination is that the uplink subframe or the downlink subframe is to be divided, and
the transmitter is configured to transmit the allocation information to the radio communication relay station apparatus.

7. A radio communication mobile station apparatus for communicating with a radio communication base station apparatus via a radio communication relay station apparatus, the radio communication mobile station apparatus comprising:
a receiver that is configured to receive first data relayed from the radio communication relay station apparatus;
a transmitter that is configured to transmit second data to the radio communication relay station apparatus; and
a selector that is configured to select the first or second data, in an uplink subframe set in a first cell of the radio communication base station apparatus or a downlink subframe set in a second cell of the radio communication relay station apparatus, wherein
the receiver is configured to receive allocation information for dividing an uplink subframe or a downlink subframe and switching transmission/reception between the divided uplink subframe or the divided downlink subframe in the mobile station apparatus from the radio communication base station apparatus via the radio communication relay station apparatus, and
the selector is configured to select either of the first data or the second data in the uplink subframe in accordance with the allocation information, or the selector is configured to select the first data in the downlink subframe in accordance with the allocation information.

8. The radio communication mobile station apparatus according to claim 7, wherein
the receiver receives the first data and a downlink reference signal allocated in an OFDM symbol which is not included in the first data, when the selector selects the first data in the downlink subframe and a data length of the first data is shorter than a length of one subframe.

9. A radio communication method in a radio communication relay station apparatus for relaying communication between a radio communication base station apparatus and a radio communication mobile station apparatus, the radio communication method comprising:
receiving data from the radio communication base station apparatus or the radio communication mobile station apparatus;
selecting received data in an uplink subframe or a downlink subframe, from: first data to be relayed from the radio communication relay station apparatus to the radio communication base station apparatus; second data to be relayed from the radio communication relay station apparatus to the radio communication mobile station apparatus; third data to be transmitted from the radio communication base station apparatus to the radio communication relay station apparatus; and fourth data to be transmitted from the radio communication mobile station apparatus to the radio communication relay station apparatus;
receiving allocation information for dividing the uplink subframe or the downlink subframe and switching transmission/reception between the divided uplink subframe or the divided downlink subframe in the radio communication relay station apparatus from the radio communication base station apparatus; and
switching the first data and the fourth data, or the first data and the second data, between the divided uplink subframe in accordance with the received allocation information, or
switching the second data and the third data, or the fourth data and the third data, between the divided downlink subframe in accordance with the received allocation information.

10. A radio communication method in a radio communication base station apparatus for communicating with a radio communication mobile station apparatus via a radio communication relay station apparatus, the radio communication method comprising:
determining whether an uplink subframe or a downlink subframe is to be divided based on an amount of traffic between the radio communication base station apparatus and the radio communication relay station apparatus, between the radio communication base station apparatus and the radio communication mobile station apparatus, or between the radio communication relay station apparatus and the radio communication mobile station apparatus;
generating allocation information for dividing the uplink subframe or the downlink subframe and switching transmission/reception between the divided uplink subframe or the divided downlink subframe in the radio communication relay station apparatus in accordance with a result of the determination; and
transmitting the allocation information to the radio communication relay station apparatus.

11. A radio communication method in a radio communication mobile station apparatus for communicating with a radio communication base station apparatus via a radio communication relay station apparatus, the radio communication method comprising:
   receiving allocation information for dividing an uplink subframe or a downlink subframe and switching transmission/reception between the divided uplink subframe or the divided downlink subframe in the radio communication mobile station apparatus from the radio communication base station apparatus via the radio communication relay station apparatus;
   selecting any one data, in a subframe which is set to an uplink subframe in a first cell of the radio communication base station apparatus, from first data to be relayed from the radio communication relay station apparatus to the radio communication mobile station apparatus and second data to be transmitted from the radio communication mobile station apparatus to the radio communication relay station apparatus; and
   selecting the first data among the first and second data, in a subframe which is set to a downlink subframe in a second cell of the radio communication relay station apparatus.

* * * * *